United States Patent
Hickey et al.

(10) Patent No.: US 6,328,502 B1
(45) Date of Patent: Dec. 11, 2001

(54) HORIZONTAL REEL BARGE

(75) Inventors: Sean Michael Hickey, Metairie, LA (US); Robert Conrad Malahy, Houston, TX (US); Michael Joseph Fibich, New Orleans, LA (US)

(73) Assignee: Global Industries, Ltd., Carlyss, LA (US)

( * ) Notice: Subject to any disclaimer, the term of this patent is extended or adjusted under 35 U.S.C. 154(b) by 0 days.

(21) Appl. No.: 09/339,135

(22) Filed: Jun. 24, 1999

(51) Int. Cl.[7] ................................................ B63B 36/04
(52) U.S. Cl. ................................... 405/168.3; 405/168.4
(58) Field of Search ............................ 405/166, 168.3, 405/168.4, 154

(56) References Cited

U.S. PATENT DOCUMENTS

| | | | |
|---|---|---|---|
| 3,237,438 | * 3/1966 | Tesson | 405/168.3 |
| 4,269,540 | * 5/1981 | Uyeda et al. | 405/168.3 |
| 4,917,540 | * 4/1990 | Recalde | 405/168.3 |
| 4,984,934 | * 1/1991 | Recalde | 405/168.3 |
| 6,059,478 | * 5/2000 | Martin et al. | 405/168.3 |

* cited by examiner

Primary Examiner—William Neuder
(74) Attorney, Agent, or Firm—David M. Ostfeld

(57) ABSTRACT

An apparatus for laying deep water sub sea pipelines either by means of reeled pipe or conventional pipelay ("stock on") is disclosed. The vessel is equipped with a dynamic positioning system that is integrated into the pipelay control system. Both methods of pipe lay utilize a rigid stinger capable of supporting the pipe from near 0 degrees through a departure angle of 90 degrees, simulating a J-lay orientation. The Reel System consists of a storage reel, reel drive system, straightener aligner system, two tensioner systems, three exit rollers, stinger and dynamic positioning system. The conventional pipelay system consists of the above without the storage reel and reel drive system. All pipelay equipment has the capability of leveling winding, thus maintaining a specific pipe profile while the pipe is either being spooled on the quay side or laid on the seabed. The storage reel is modular where it can be removed by either skidding or divided into piece lifts. The apparatus has the ability of interchanging operation modes from reeled pipelay to conventional pipelay without abandoning the pipeline.

38 Claims, 22 Drawing Sheets

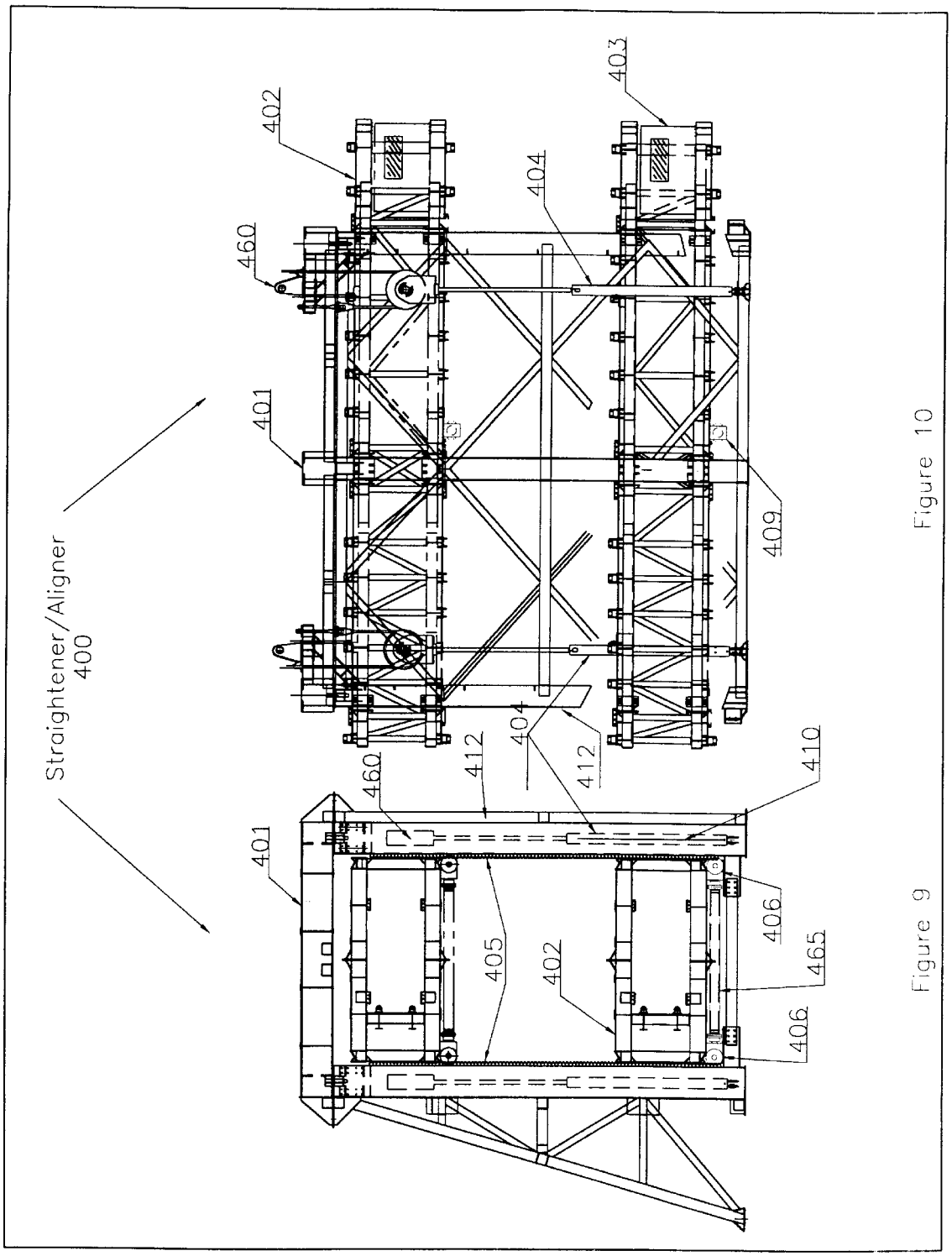

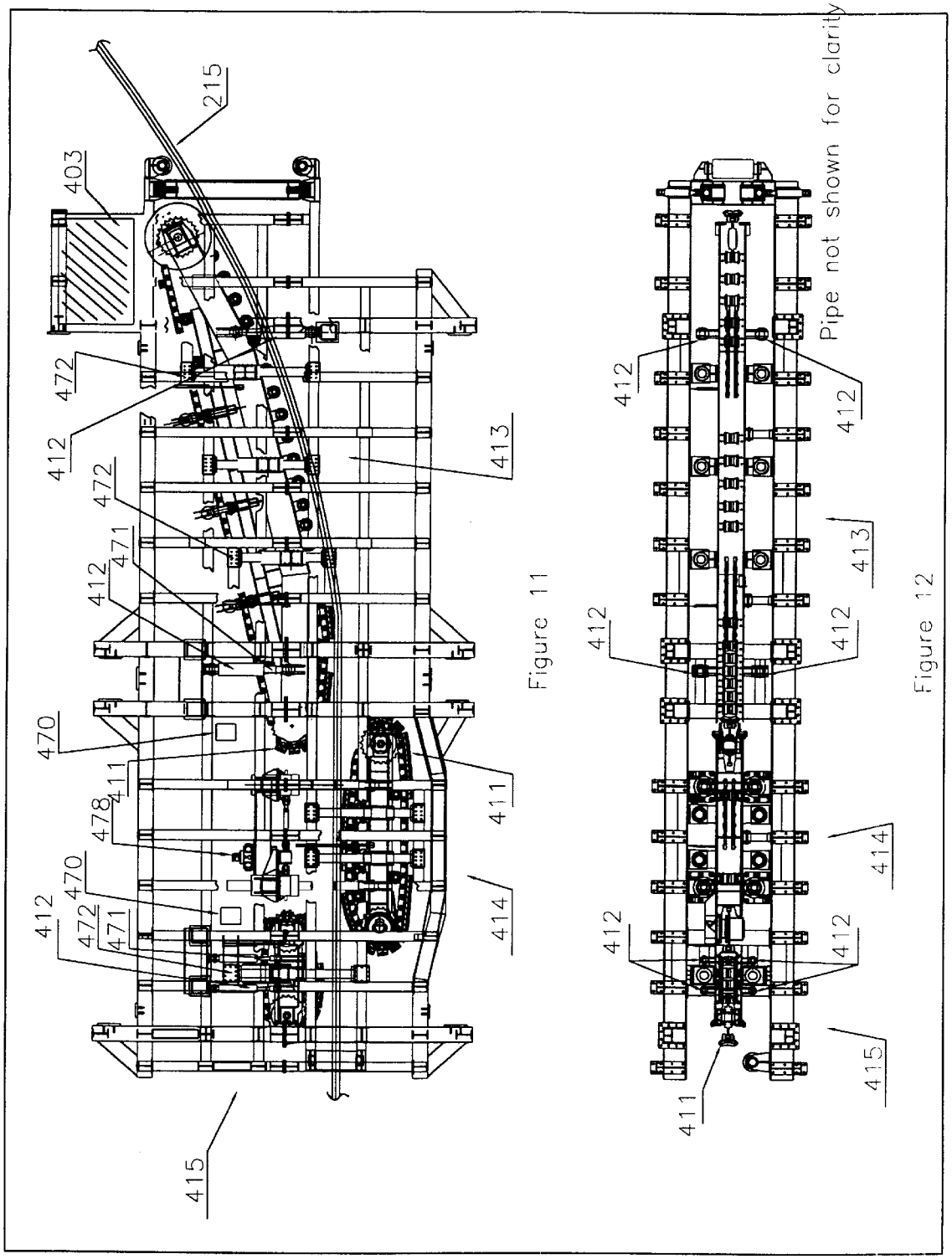

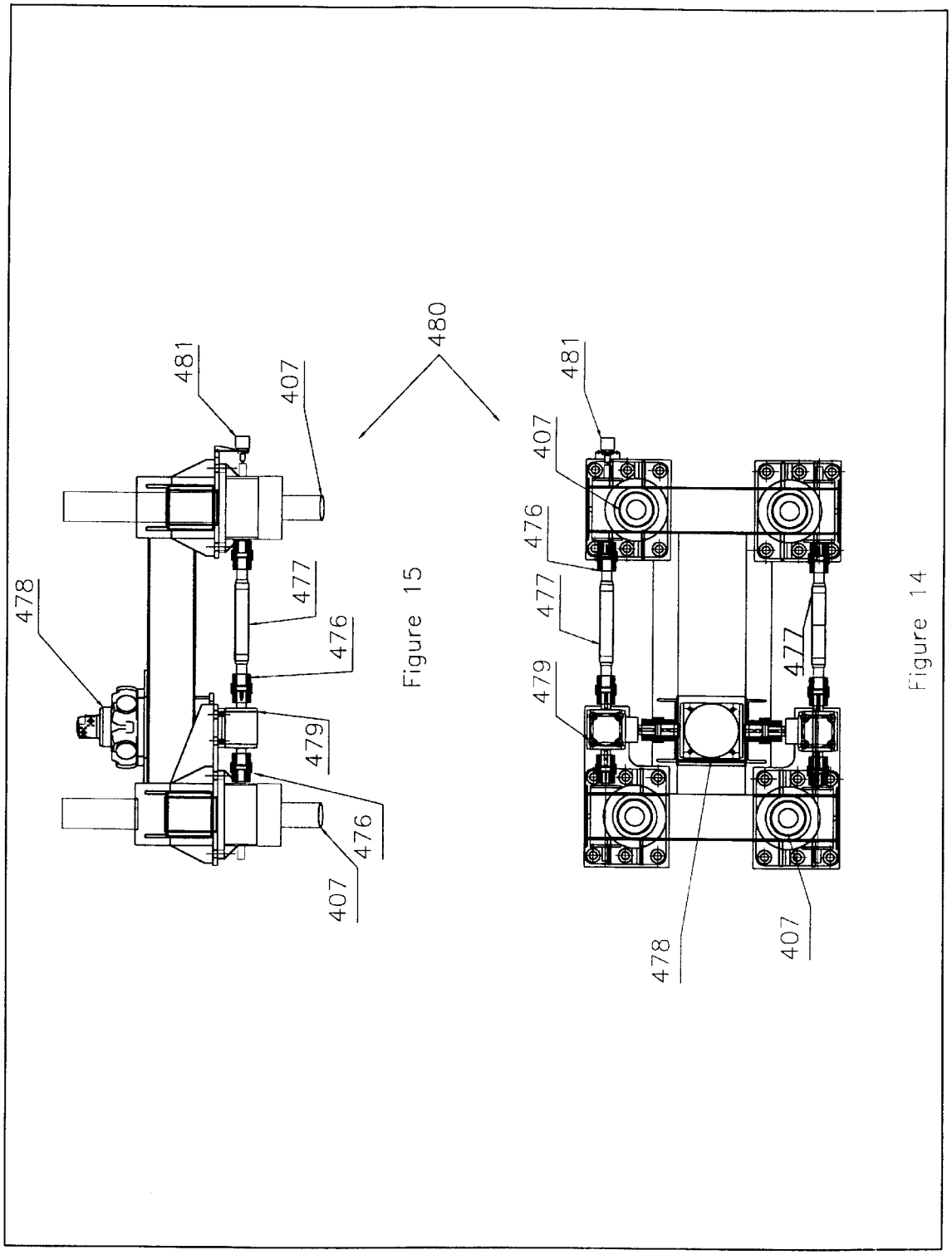

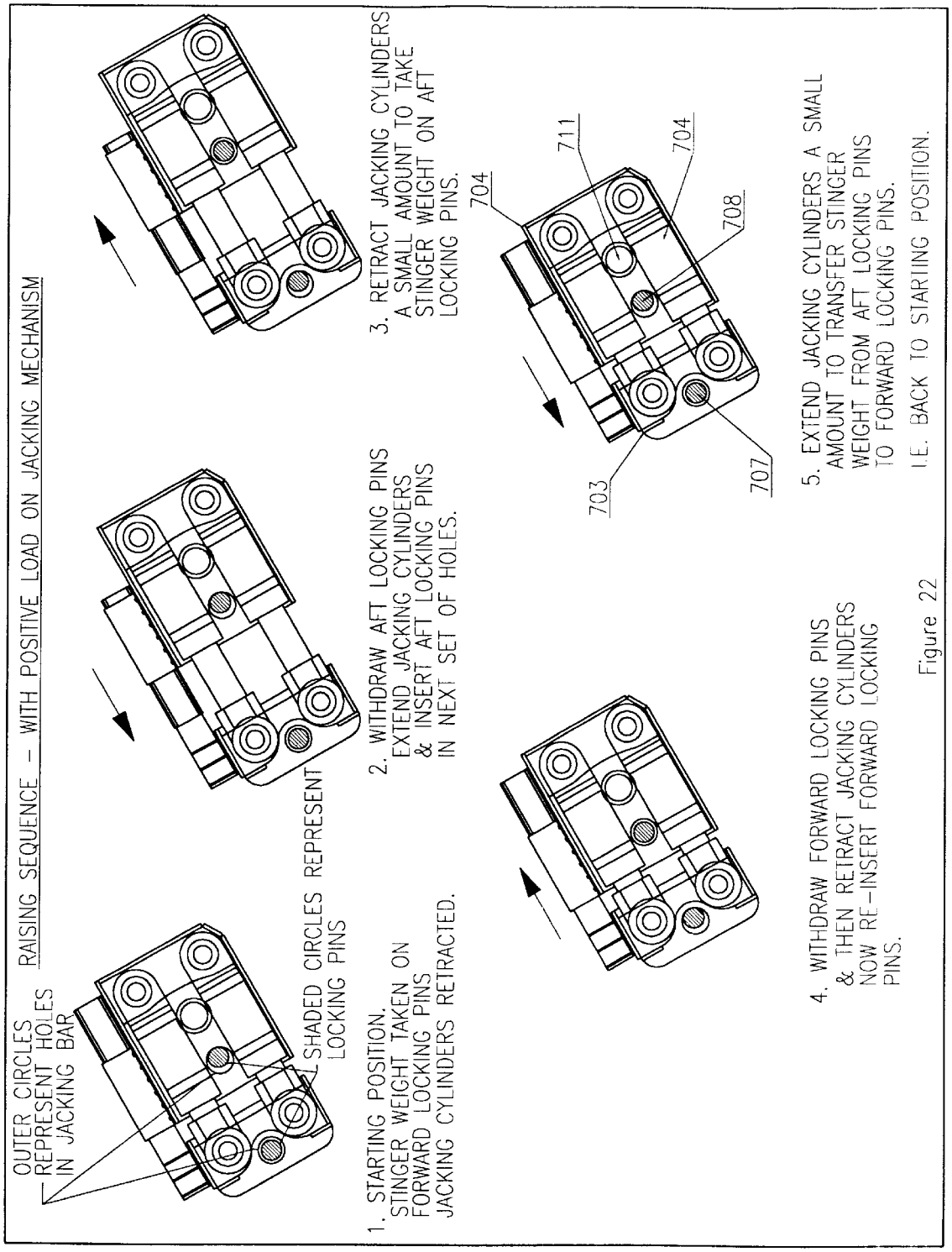

HORIZONTAL REEL BARGE

BACKGROUND OF INVENTION

1. Field of the Invention

This invention is related to the conventional lay and the reeled lay methods and apparatus for laying underwater pipelines and the control of the equipment for lay of pipeline.

2. Background

As the search for oil continues to move to deeper more remote areas, there have been strides in the oil industry to create multi-faceted vessels. Moreover, the oil industry direction is to equip one vessel with the ability to perform multi tasked operations pertaining to heavy lift, offshore construction, dive support, deep water pipelay and deep water umbilical cabling systems. The prior art does not disclose a multitasking apparatus or method. It is an object of the present invention to have the ability to continuously lay all types of sub sea pipelines conventionally or reeled to include but not limited to: 1) single wall concrete, 2) single wall plastic coated, 3) single wall no coat, 4) pipe-in-pipe systems coated/uncoated (referred to in this specification as "pipe" or "pipe 215").

Many studies have been done comparing conventional and reeled methods of laying sub sea pipelines. The main advantage of the conventional lay ("stock on") method is the ability to stay on location constructing a pipeline and have the individual stalks of pipe brought out to the vessel by a material barge. The advantage of the reeled method is the ability to lay long lengths of pipe during limited weather windows. In the reel method the pipe construction is done at the quay where a costly spread of tugs, boats, fuel, full compliment of personnel, etc. are not needed in the construction of the pipeline. The prior art only shows use of one of the two modes for any barge apparatus. It is an object of the present invention to change modes of operation to be job specific.

Industry utilizes two types of storage reels for reeled pipe systems, 1) Vertical Reel, 2) Horizontal Reel. Both types possess advantages and disadvantages inherent in their designs. A disadvantage of the vertical reel is that the stability of the vessel is compromised with a high center of gravity. Another disadvantage of a vertical reel is the structure weighs more than that of a horizontal reel given the same storage capacity. It is another object of the present invention to have a significantly lower center of gravity thus creating a more stable vessel.

In certain pipeline scenarios the same pipeline can change its physical parameters due to the operational requirements and water depth. Pipelines can change wall thickness, buckle arrestors, anodes, poly-coated to concrete coated, etc. Pipelay vessels of the prior art can only satisfy one operational requirement where the pipe has to be abandoned on the seabed and another vessel has to be mobilized to complete the scope of work. This abandonment and recovery process is extremely time consuming and expensive. It is another object of the present invention to have the capability to change from reel pipelay mode to conventional pipelay mode and deal with all manner of pipe without abandoning the pipeline in open water on location.

The fatigue of the pipe is a important parameter in reeled systems. Minimizing fatigue in reeled pipe systems is paramount in ultra deep laying operations. For example, in the Chickasaw design, the pipe is subjected to reverse bending during the spooling and unreeling process. The pipe always goes through one bending operation as it is plastically deformed around the hub of the reel which reverse bends the pipe. It is an additional object of the present invention to only plastically deform the pipe once to spool and unreel the pipe on/off the storage reel.

As pipelay operations continue into deeper waters, anchor systems to position the barge are limiting with excessive water depth. To operate in ultra deep waters, Dynamic Positioning Systems are utilized. In pipe lay systems of the prior art, the pipe laying operations and the positioning of the vessel are independent systems with job specific personnel operating them. The efficiency and control to lay pipe utilizing these independent systems can become impaired. It is a further object of the present invention to integrate the control of both systems described into one single unit, thus having the ability to achieve maximum efficiency and control of both systems simultaneously.

The laying of sub sea pipelines has been done using either the S-lay or J-lay method. The S-lay method dictates the pipes orientation from the deck of the vessel to the seabed is in the shape of an "S", namely S-lay. The J-lay method dictates the pipes orientation from the vessel to the seabed in the shape of a "J", namely J-lay. Both methods "S" and "J" lay have their limitations. Generally, "J" lay has limitations dependent on minimum water depth and "S" lay having limitations on maximum water depth. Other S-lay operations are limited by water depth, moreover, the excessive strain imposed by the over bend of the pipe created by the stinger overcomes the structural integrity of the pipe. It is an object of the present invention to incorporate both methods.

SUMMARY OF THE INVENTION

This invention discloses a combination of both conventional lay and reeled lay operations, including modular removal of the reel to permit conventional lay operations. However, the specialized equipment pertaining to the reel is obviously more related to the reeled method of pipelay other than its configuration for ease in removal to accommodate a station for conventional pipelay. The control of both modes of pipelay are integrated into the Dynamic Positioning System of the vessel.

The Reel System comprises a storage Reel located forward on the vessel with the remaining equipment aft. The capacity of the reel may be quite large, such as storing 84 miles of 6-inch steel pipe or 11 miles of 18 inch steel pipe (wall thickness=1.25 inch). The pipe is spooled onto the storage reel at the quay. After the pipe is spooled the vessel relocates offshore to lay the pipe on the seabed. During the spooling operation, utilizing the complementary side of the vessel, the pipe is plastically deformed once. The centering device for this invention spools and unreels at various levels at the complimentary side requiring only 20 degrees for straightening. To accomplish this the remaining equipment aft of the straightener/aligner must level wind respectively as the pipe unreels to achieve a desired pipe profile thus minimizing the stress imposed on the pipe.

This invention is capable of changing from reel mode of operation to conventional mode of operation without abandoning the pipeline. With the desired amount of reeled pipe on the seabed the pipe is severed at a straightener/aligner. The reel may be removed by either skidding or divided into piece lifts because of the modular nature of the reel. With the reel removed the stocks of pipe and the pipe handling system can be installed at a special station to continue pipelay in the conventional mode without abandoning and recovering the pipeline. For the present invention, both modes, conventional and reeled, of pipe lay operations will utilize a rigid stinger creating the capability to lay pipe in ultra deep water.

DESCRIPTION OF THE DRAWINGS

For a further understanding of the nature and objects of the present invention, reference should be had to the following drawings taken in conjunction with the specification, and wherein like parts are given like reference numerals and wherein:

FIG. 9 is an end elevation view of the straightener/aligner aft looking forward;

FIG. 10 is a side elevation view of the straightener/aligner starboard looking port;

FIG. 11 is a plan view of the carriage of the straightener/aligner;

FIG. 12 is a side elevation view of the straightener/aligner of FIG. 11;

FIG. 14 is the elevation view of the synchronizing system for the middle track of the carriage of the straightener/aligner;

FIG. 15 is the plan view of the synchronizing system for the middle track of the carriage of the straightener/aligner;

FIG. 22 is a jacking sequence for the jacking system of FIG. 20;

DETAILED DESCRIPTION OF THE PREFERRED EMBODIMENT

Figure 1:
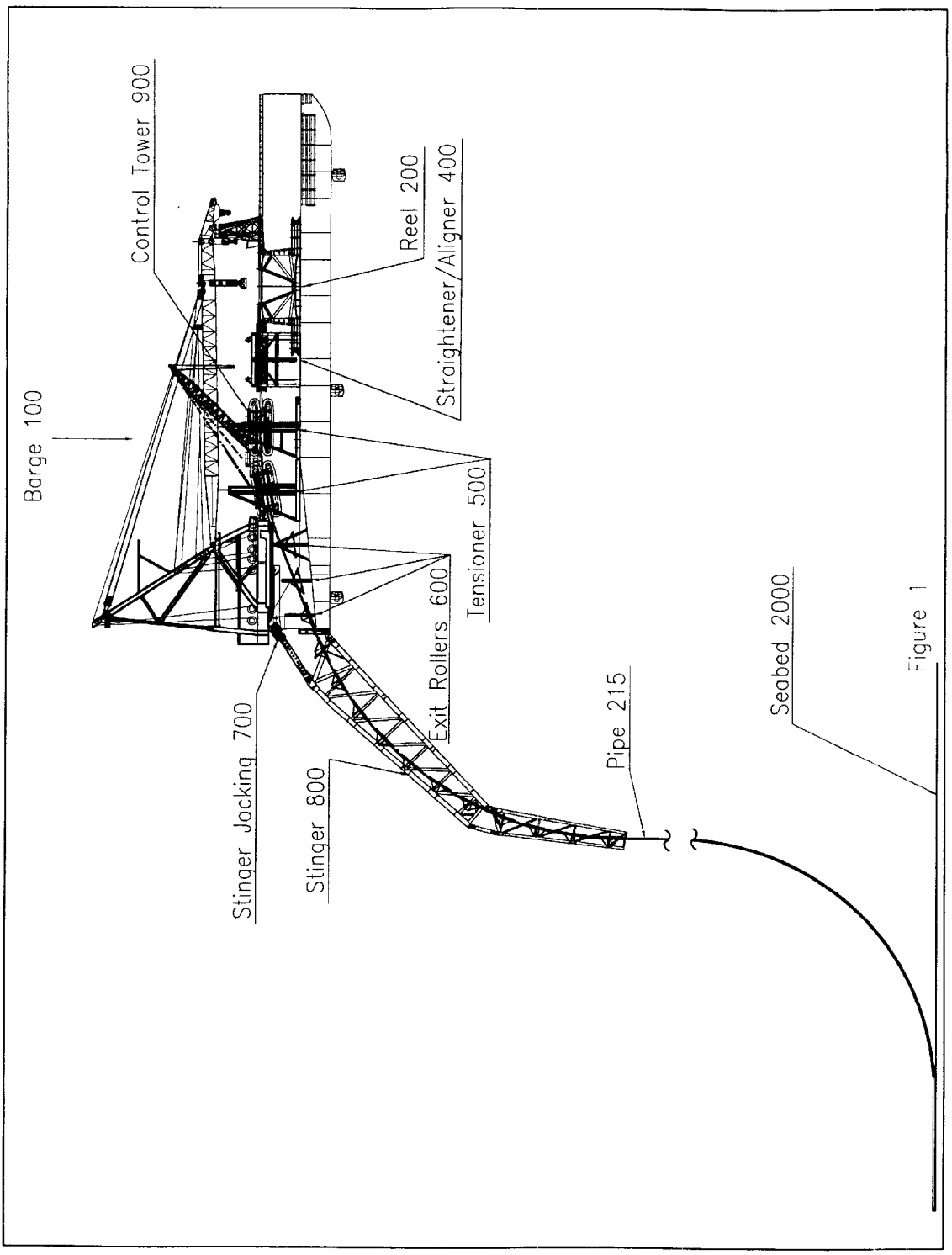
FIG. 1 is a general arrangement side elevation view of a preferred embodiment of the present invention.
Figure 2:
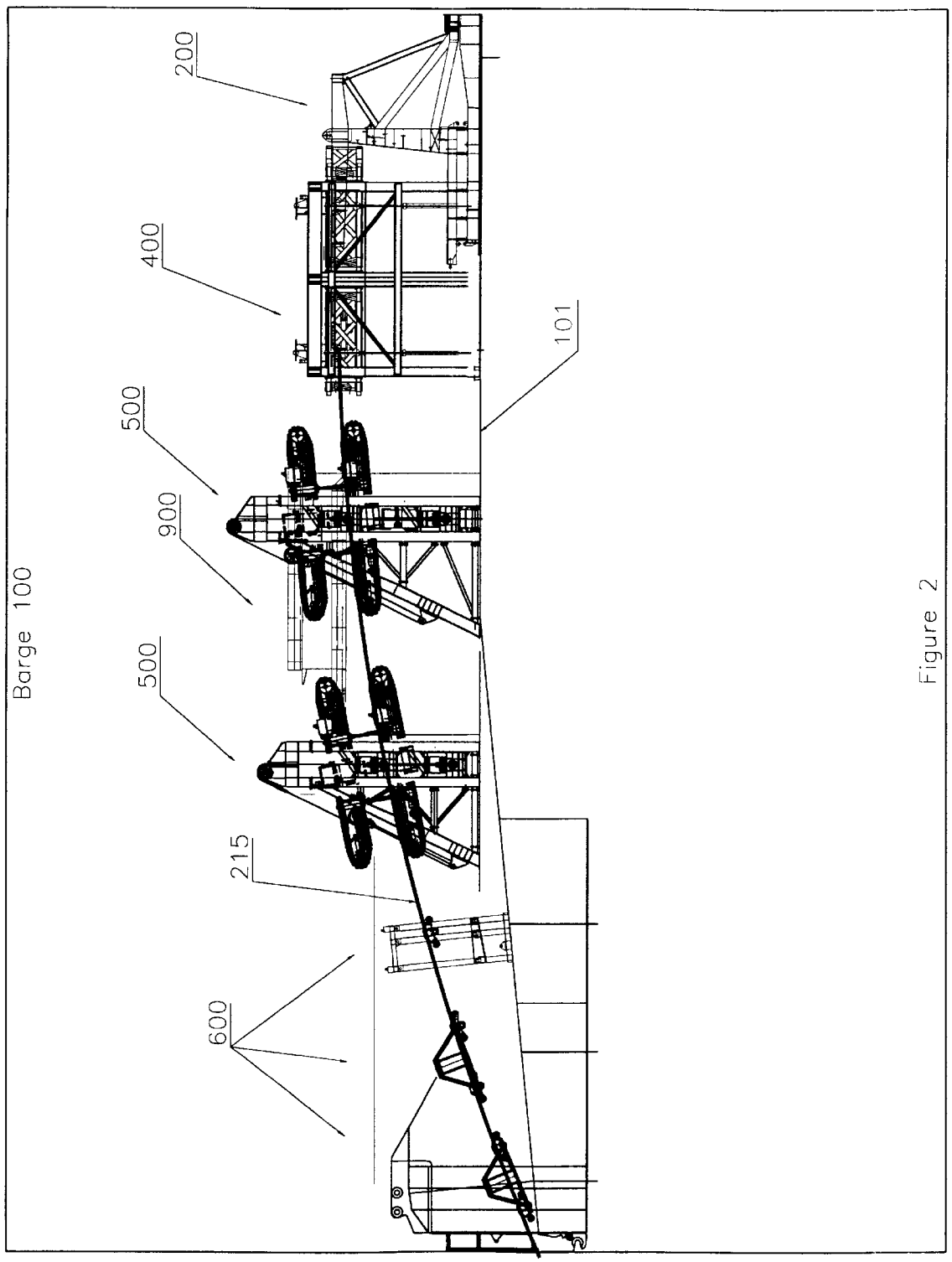
FIG. 2 is a general arrangement side partial view of a preferred embodiment of the present invention.
Figure 3:
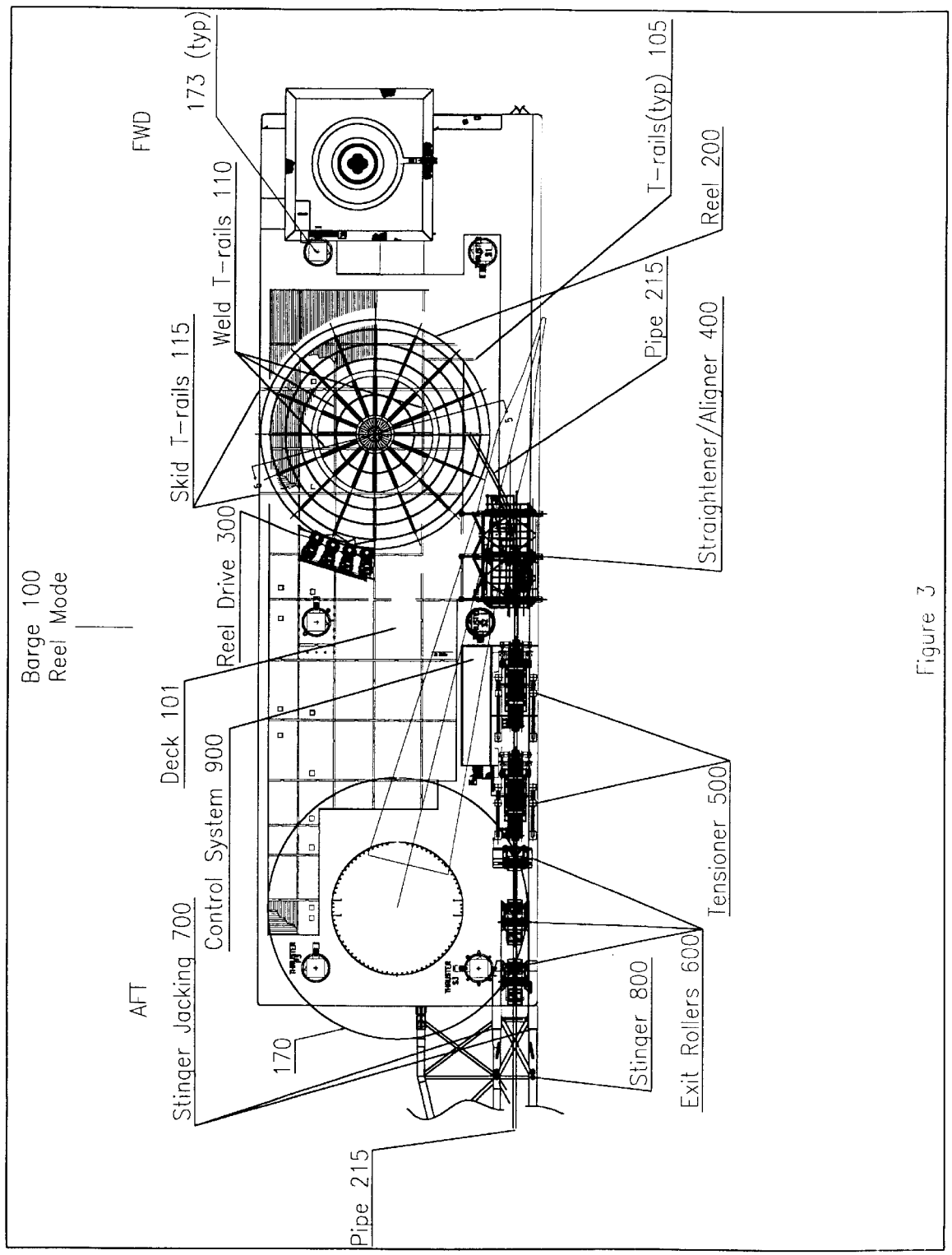
FIG. 3 is a general arrangement plan view of a preferred embodiment of the present invention.

As shown in FIGS. 1, 2, and 3, a barge 100 includes a storage reel 200. Reel 200 is rotatably affixed to the decking, such as t-rails 105, of a barge 100 by a mechanism to prevent the reel from lateral movement, such as welding preferably as discussed below. Alternatively, shear blocks (not shown) may be used to block movement of the reel relative to the barge 100 in directions of shear of the block. For purposes of removal of the reel 200 from the barge 100, in the preferred embodiment, the welds would be removed and then the reel 200 removed as set out below. In alternate embodiments, such as for shear blocks, the blocks would be removed mechanically from their fit between the barge t-rails 105 where the shear blocks would be mounted within a plate and juxtaposed to the reel 200.

Figure 23:
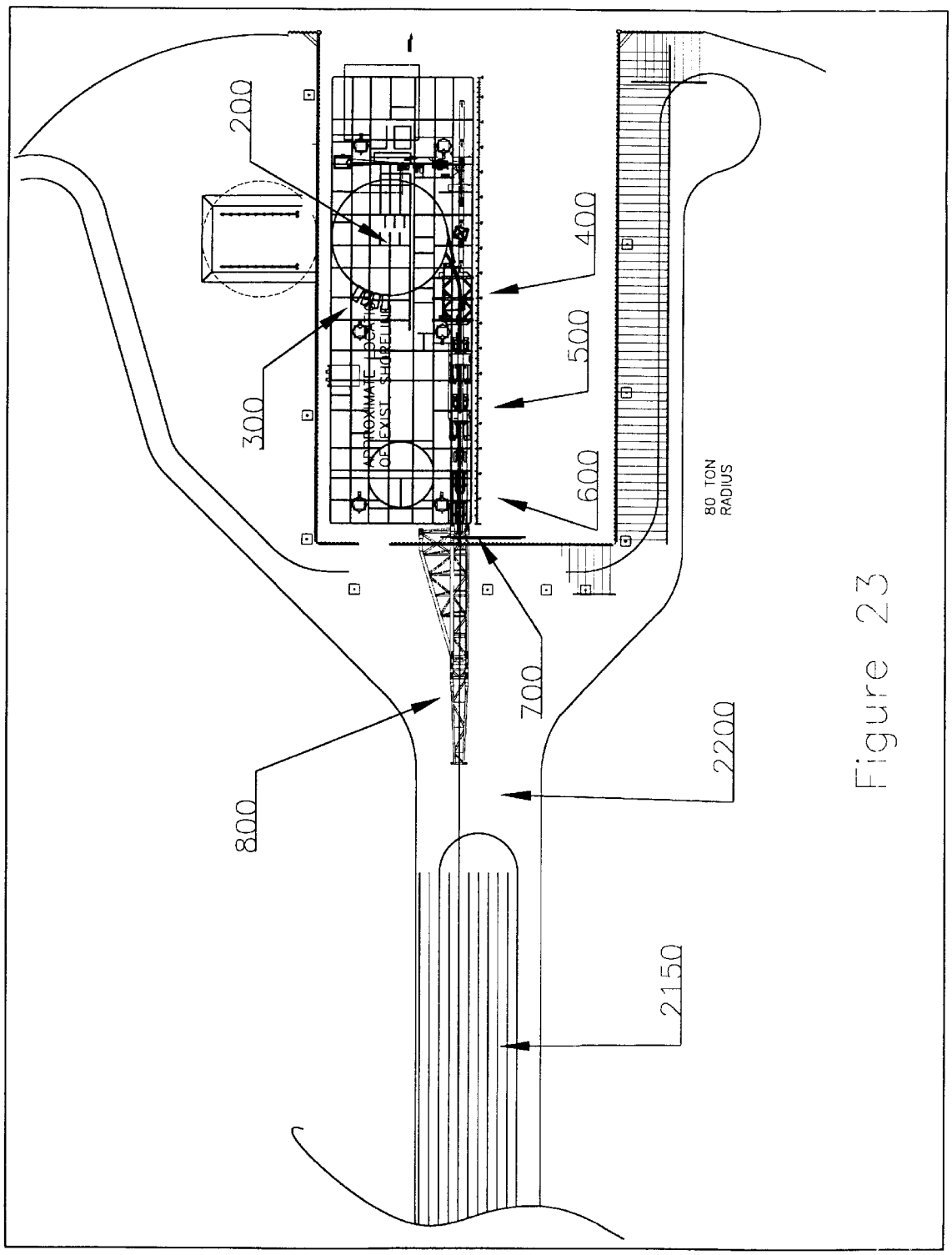
FIG. 23 illustrates the pipe handling system at the quay during spooling.
Figure 24:
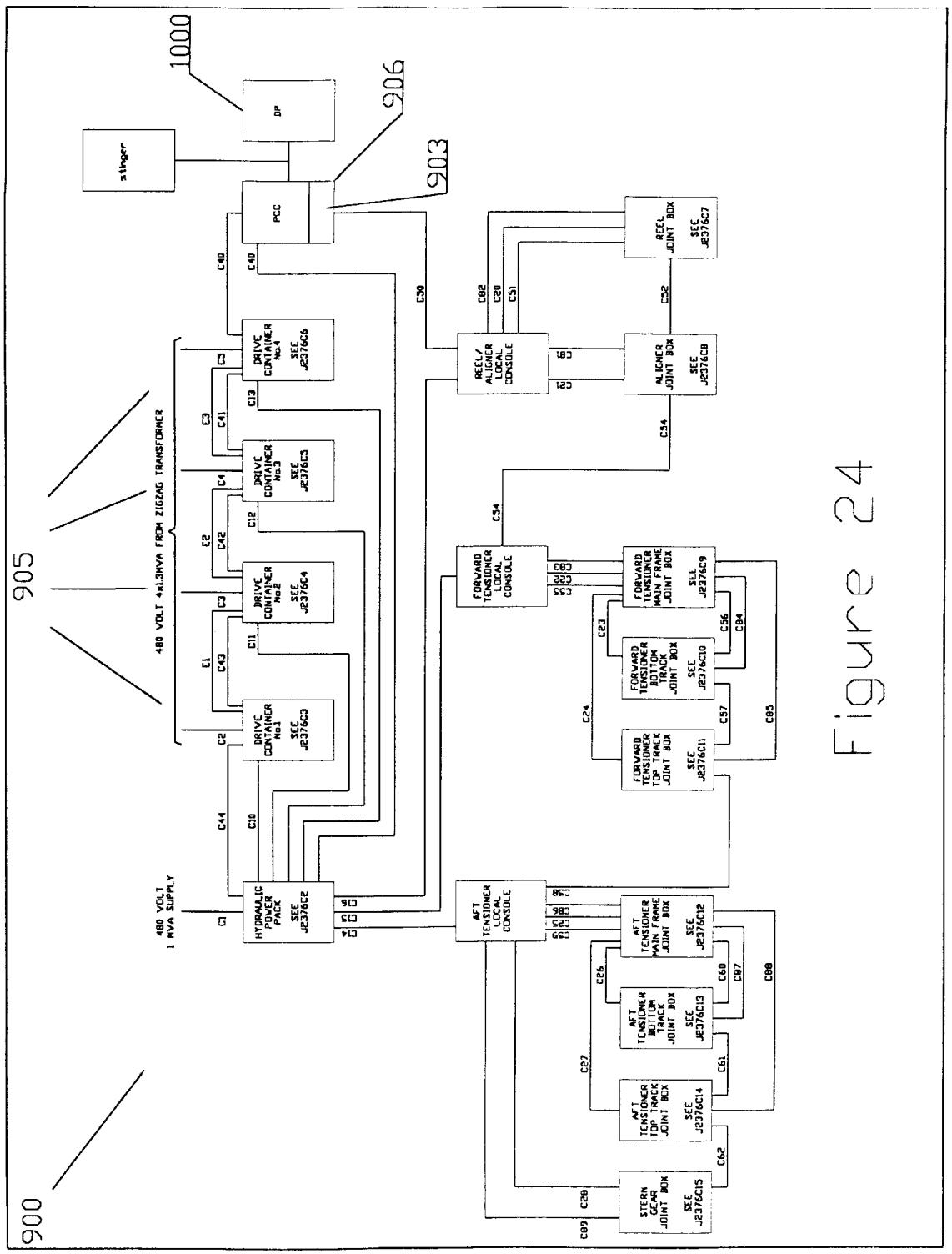
FIG. 24 is a line diagram of the Control System of the first preferred embodiment of the present invention.
Figure 25:
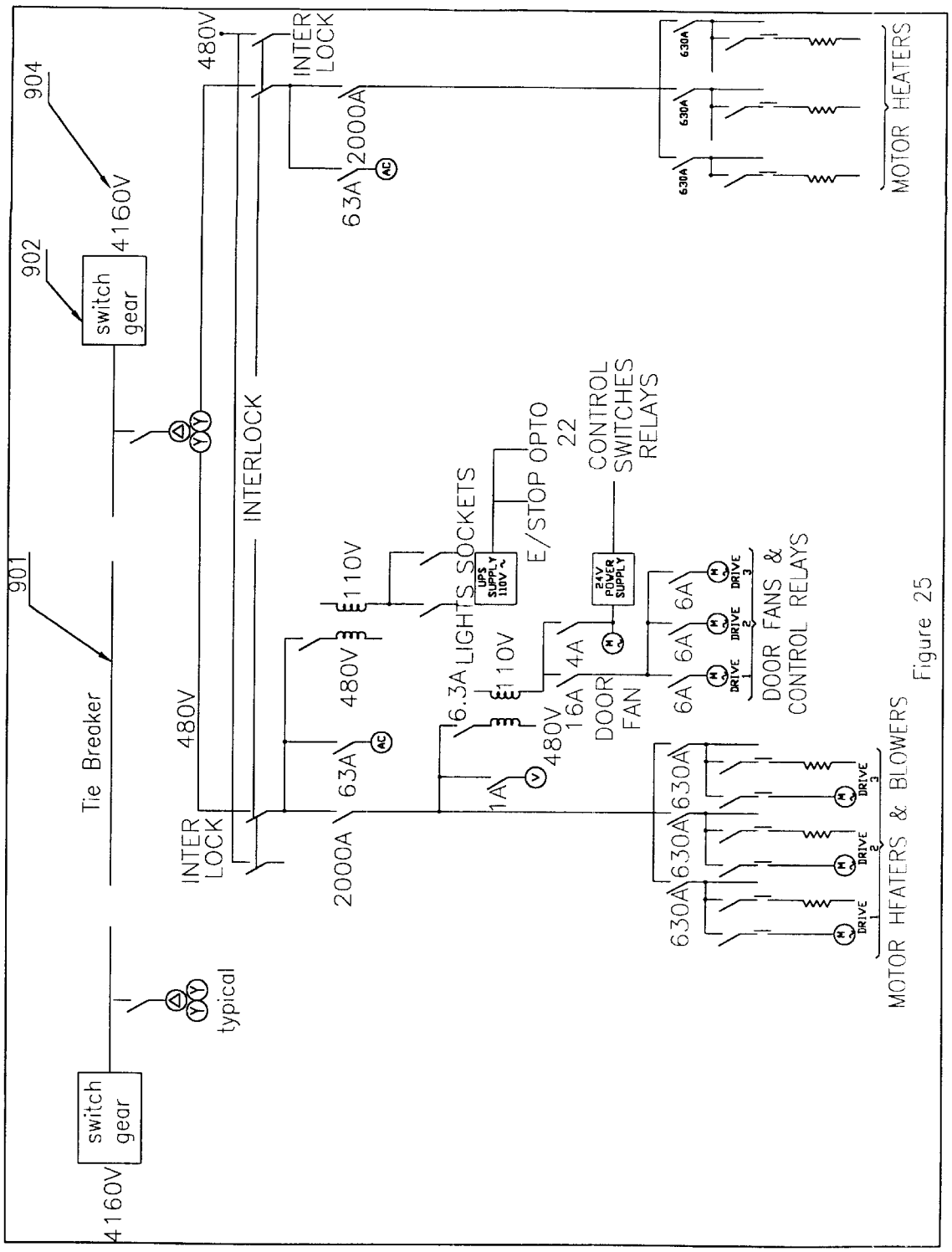
FIG. 25 is a cable line diagram of the 4160V electrical supply to one of the four drive containers.

The reel 200 is mounted on the complementary side of the barge 100, requiring only 20 degrees for straightening. Reel 200 is driven by a reel drive system 300. The reel 200 has pipe 215 spooled thereon. The pipe 215 is spooled onto reel 200 after the reel 200 is mounted on and connected to barge 100. Normally, a tensioner 500 and a straightener 400 would maintain sufficient tensile force on pipe 215 to maintain its spool onto reel 200 as discussed below. Alternatively, for example, pad eyes 218 are mounted on reel 200 and the end of the pipe 215 may be bridled by cable (not shown) between the end of the pipe 215 and pad eyes 218 to maintain tension on the pipe after it is reeled onto reel 200. For a spooling purpose, typically 40 foot segments of pipe 215 are welded together into 2700 foot sections of pipe 2150 stationed on the quay 2200 (FIG. 23). This pipe 215 as long sections 2150 would then be fed to a stinger 800 in its highest position and thence through a stinger jacking system 700, exit rollers 600, tensioners 500, a straightener/aligner 400, to reel 200 where the spooling onto reel 200 occurs as discussed in more detail below. During normal pipelaying, pipe 215 is fed to straightener/aligner 400, and then through two tensioners 500, three exit rollers 600, stinger jacking system 700, and finally is fed to a stinger 800, all of which is controlled by a control system 900.

Figure 4:
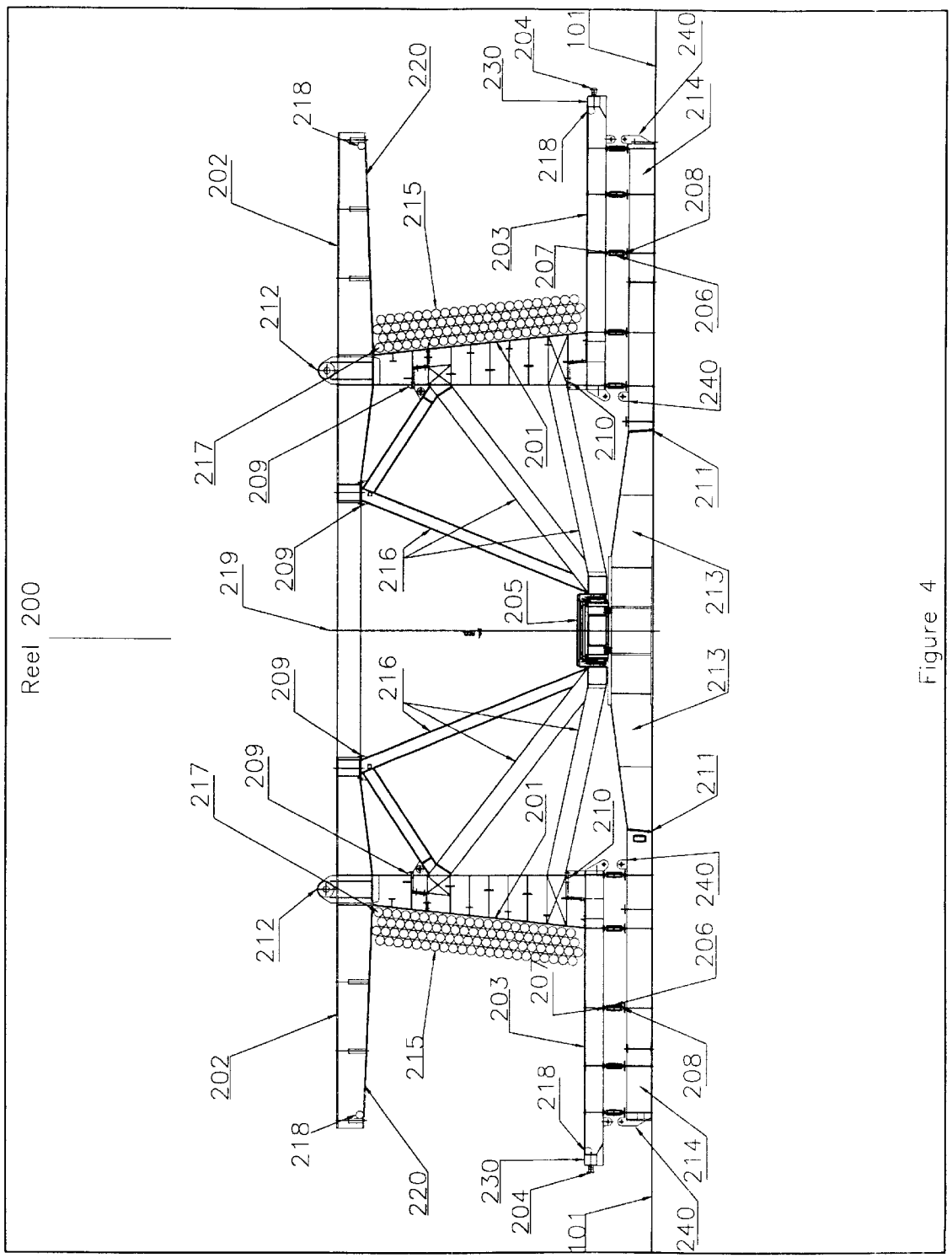
FIG. 4 is a elevation view of the storage reel.
Figure 5:
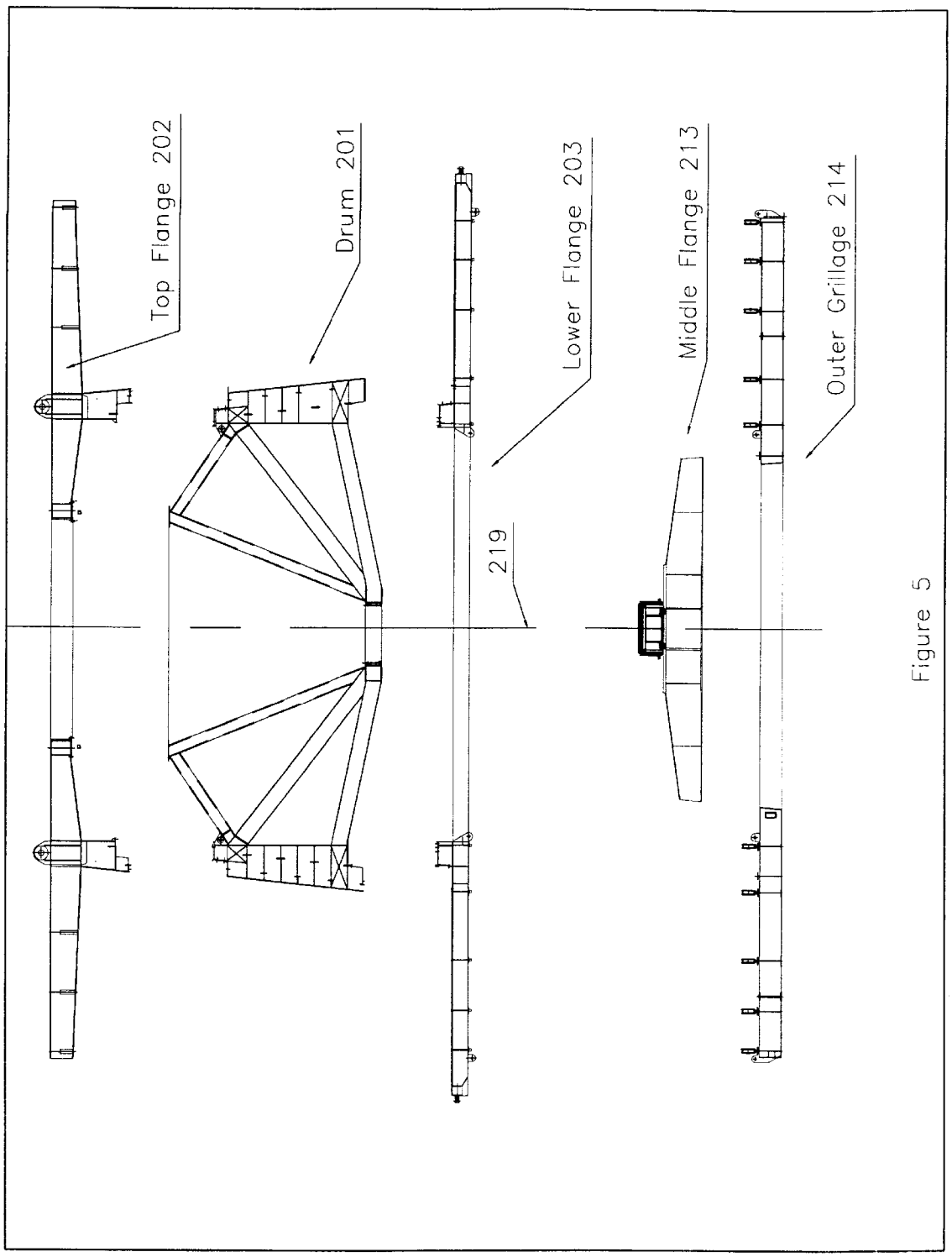
FIG. 5 is an exploded, elevation view of the storage reel subdivided into its 5 pieces.

Storage Reel 200 (FIGS. 4 & 5)

The storage reel 200 is shown in FIGS. 4 and 5 to be divided into five pieces ("Pieces") outer grillage 214, middle grillage 213, lower flange 203, drum 201, and top flange 202 (See FIG. 5) bolted together. In FIG. 5, a cross sectional view is shown taken along section lines 5—5 of the storage reel 200 shown in FIG. 3. Thus the reel 200 is comprised in descending order of the Pieces: (1) the top flange 202; (2) the drum 201 having drum outer surface 217 and bolted 209 at its top to flange 202; (3) the lower flange 203 bolted 210 to drum 201 at the lower end of drum 201; (4) the middle grillage 213 resting on the t-rails 105 (not shown but well known in the art) of the deck 101 of the barge 100 and welded at 110 to the t-rails 105 of deck 101 and are also connected to the internal stiffening 216 of the drum 201 by a bearing outer surface 205, to rotatably connect the drum 201 and the fixed middle grillage 213; and (5) the outer grillage 214 also resting on barge 100 deck 101, abutting middle grillage 213. Outer grillage 214 is not welded to the deck 101. Outer grillage 214 is bolted 211 to middle grillage 213 and supports wheels 206 riding on t-rails 207 or by bearings or other rotatable structure which rotatably supports lower flange 203. The rotational axes of all of the Pieces are coaxial with axis 219. Thus, flange 203, drum 201, flange 202 will rotate about the rotational axis 219 relative to outer and inner grillage 214, 213, which are fixed with respect to lower flange 203. There is shown in FIG. 2 a cross section of the storage reel with spooled pipe 215.

The storage reel 200 utilizes a tapered drum 201. The tapered drum 201 assists the pipe 215 in being spooled onto drum 201 in a tight uniform formation. The pipe 215 would be spooled onto reel 200 starting at the lowest diameter portion of drum 201 and spooling downward toward lower flange 203. At the end of lower flange 203 as the pipe 215 works back upward to the bottom end 220 of top flange 202, it will tend under tension to catch in the crevasses of the previously spooled pipe 215 preventing the new spooled pipe 215 from slipping upward. Thus, the initiation of spooling starts at the upper most section of the drum surface 217. The pipe 215 is contained by the top flange 202 and supported by the drum 201 and the lower flange 203. The drum 201 is supported with internal stiffening 216.

The rotating portion of the storage reel 200 includes top flange 202, drum 201 and lower flange 203. The reel 200 is rotated by means of a single bull gear 204, positioned around the periphery of the lower flange 203, and engaged by four powered pinions 204. The rotating portion of the storage reel 200 is held centrally orientated by bearing 205.

The rotating reel 200 with pipe 215 is supported by multiple wheels 206, such as three hundred and sixty-six wheels 206, or bearings engaged on sets, such as two rails per set, of circular rails 207, 208, for example five sets of two rails, one rail of the set, rail 207, rotating and the other rail of the set, rail 208, static. The wheels 206 are supported by the middle grillage 213 and the outer grillage 214. The middle grillage 213 and the outer grillage 214 includes rectangular and circular I beams inter connected by weldments. The grillages 213, 214 uniformly distribute the combined load onto the deck 101 of the vessel 100.

The conventional lay mode requires the storage reel 200 and reel drive system 300 to be removed from the vessel 100. The storage reel 200 can be removed by either skidding on skids t-rails 115 or five piece lifts for the Pieces. The top flange separates from the drum at 209. The drum separates from the lower flange at 210. The lower flange rests on top of the wheels 206 with no bolted connections free to rotate. The middle grillage 213 must have welds 110 removed to separate grillage 214 from vessel 100, and outer grillage 214 separates from middle grillage 213 at location 211 upon removal of bolts holding grillage 213, 214 together. The reel 200 is also equipped to be lifted in a single lift utilizing the pad eyes 212. Links 240 mechanically connect the rotating sections 201, 202, 203 to the non rotating sections 213 and 214.

The amount of welding 110 for connecting the reel 200 to t-rails 110, 105, needs to be sufficient to prevent the reel 200 from moving relative to deck 101 or in shear with respect to t-rail 105. Alternatively, other methods, such as shear blocks are available. Such blocks would have to be thick enough so that when a block is placed in the plate set in t-rails 105, the block would not yield to shearing forces if applied to a block by reel 200 loaded with pipe 215 which is the main weight causing the shearing force.

Figure 6:
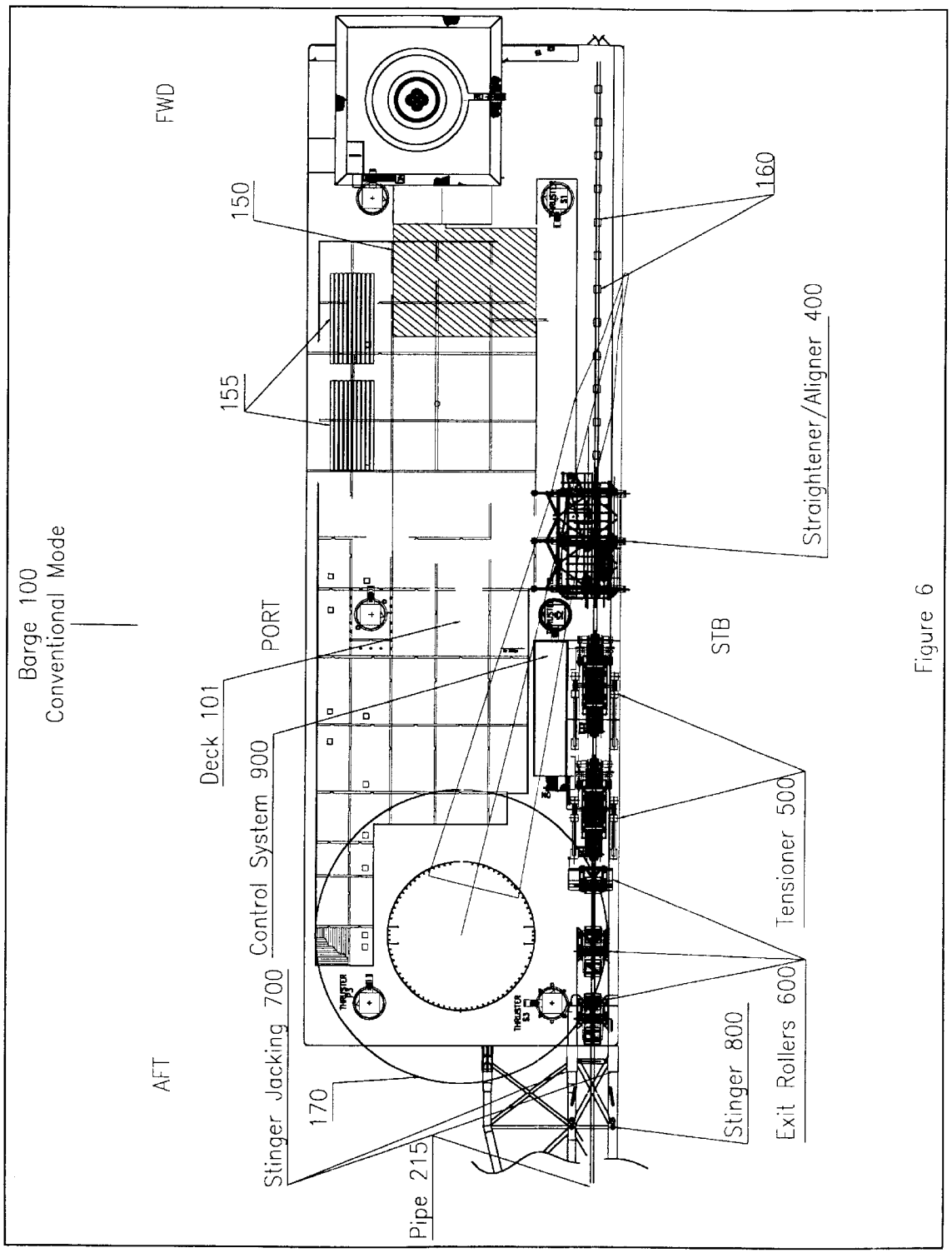
FIG. 6 is a general arrangement plan view of a second preferred embodiment of the present invention.

Conventional Laying System to Tensioner (FIG. 6)

For conventional mode the reel 200 is removed from deck 101 by, for example, utilizing crane 170 as in one of the manners discussed above, and is replaced by Pipe Handling Ramp 150. Pipe 215 is located in storage area 155 for utilization of the conventional lay process. Pipe 215 is lifted from storage 155 and introduced into the pipe handling ramp 150 as is well known in the art. In the pipe handling ramp 150 the individual sections of pipe 215 are connected together such as by welding as is also well known in the art. Ultimately the welded pipe 215 exits pipe handling ramp 150 and introduced into roller boxes 160 at the exit of pipe handling ramp 150. All the above is well known in the art.

The roller boxes 160 convey the pipe 215 into the straightener/aligner 400 location. For this purpose, as discussed below, the level winding carriage 402 is raised to its highest level (FIG. 9 in phantom line), and pipe 215 travels underneath the level winding carriage 402 to the first of the tensioners 500. It should be noted that the weight of the pipe 215 coming off of stinger 800 supplies the motivating force for the connected pipes 215 and while the roller boxes 160 have bearing supported rotational rollers, they are not powered and depend on the operation of the devices aft of straightener/aligner 400. These devices are described below and regulate the speed of feed of pipe 215 to straightener/aligner 400. The speed of pipe 215 is controlled by control system 900 controlling such devices.

Figure 7:
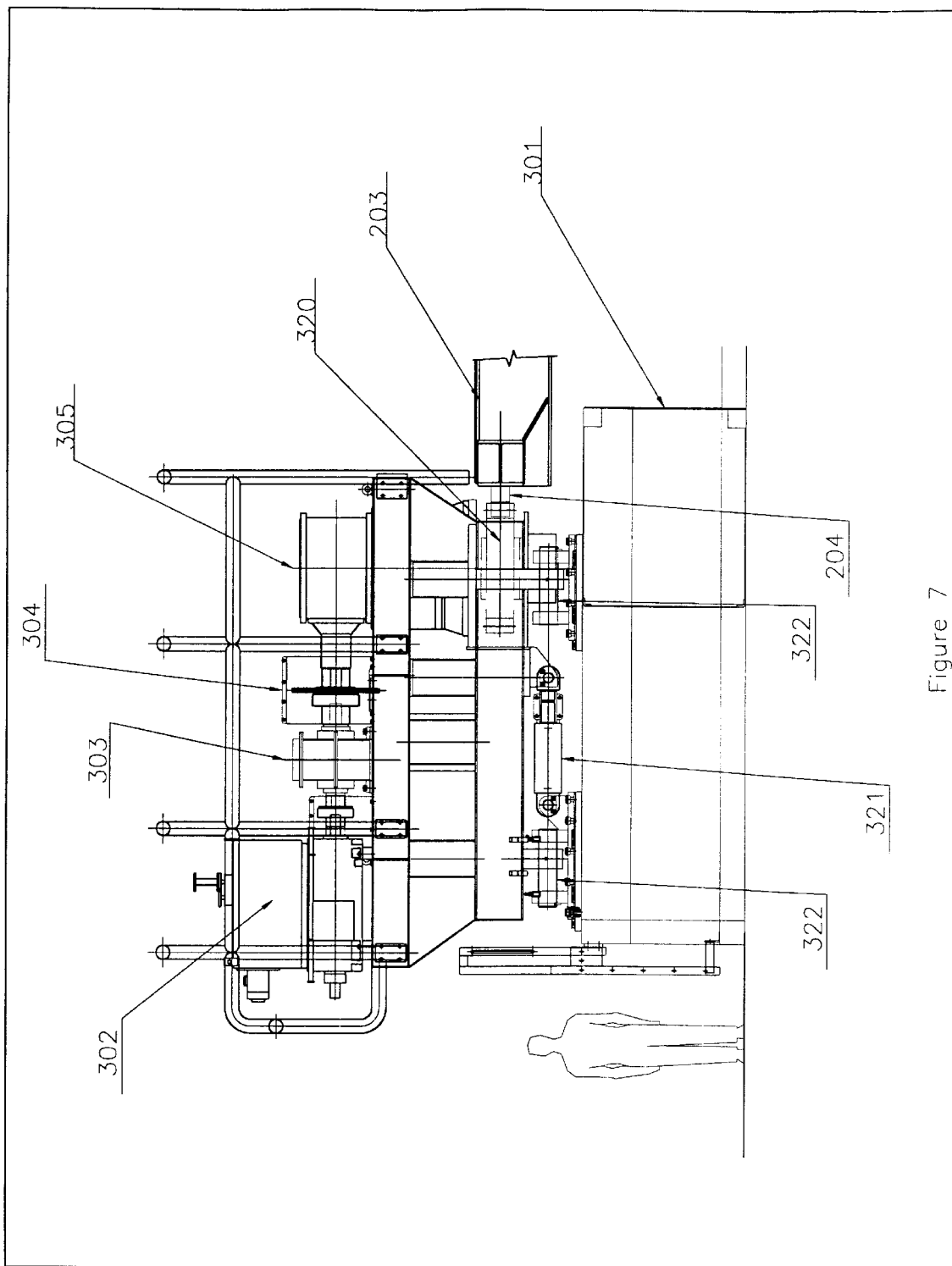
FIG. 7 is an elevation view of one reel drive motor.
Figure 8:
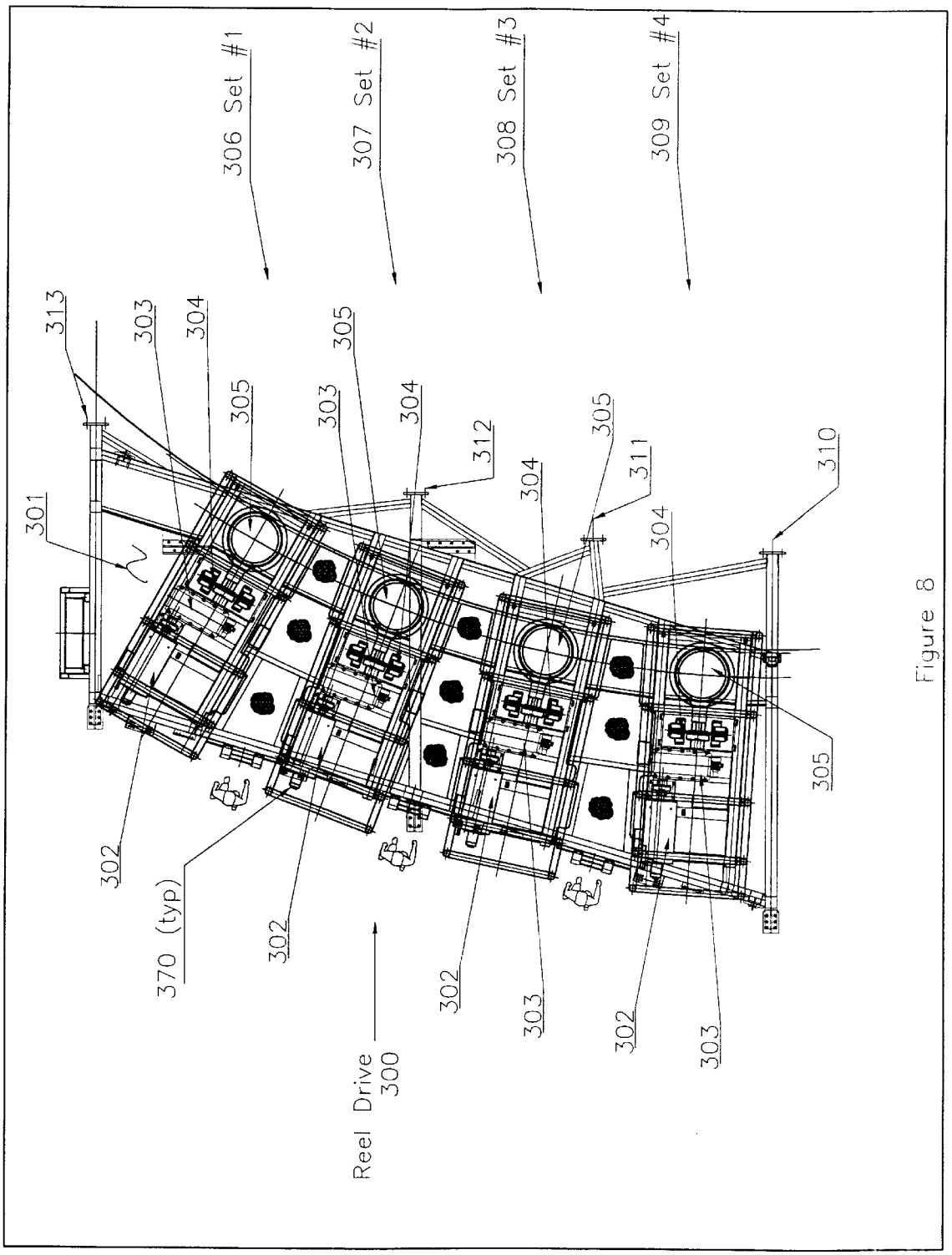
FIG. 8 is a plan view of the reel drive motor system.
Figure 13:
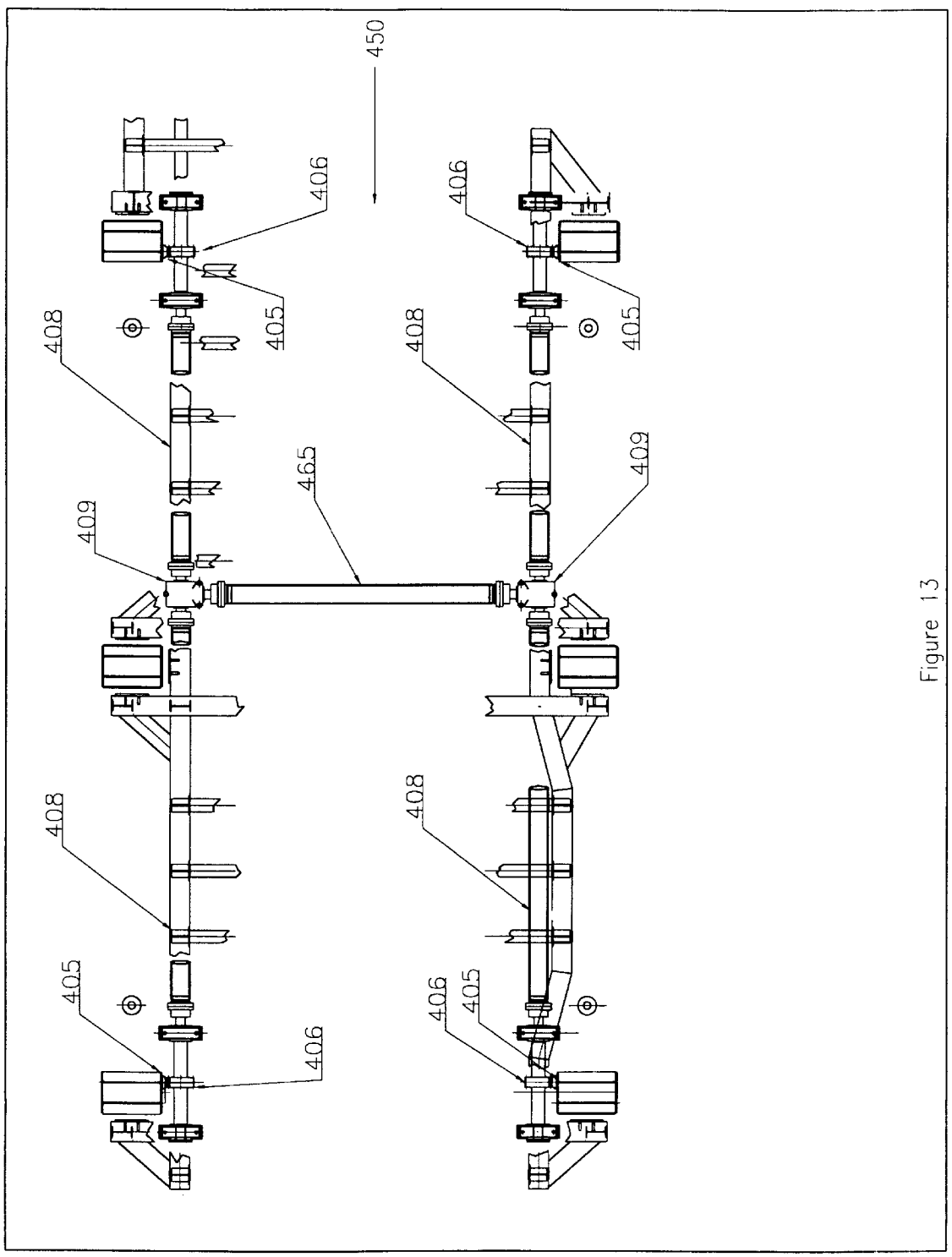
FIG. 13 is a view of the level wind synchronizing system of the carriage of the straightener/aligner.

Reel Drive System 300 (FIGS. 7 & 8)

As shown in FIG. 8, the reel drive system 300 includes four drive sets 306, 307, 308, 309 attached to a single skid 301.

Skid 301 is bolted to outer grillage 214 at locations 310, 311, 312, 313 and is welded 110 to t-rails 105. Each drive set 306, 307, 308, 309 is powered by a single DC motor 302 (such as a 285 kw motor). Each motor 302 is coupled to a two-speed gear box 303. One of the speeds of gear box 303 is to accommodate a first mode of operation of reel drive 300, a fast speed, and the other speed would be a slower speed, the exact speed depending on how fast the pipe 215 is to be spooled, reeled, paid out or hauled in. Gear box 303 is coupled to disc braked 304, coupled to right angle planetary 305, coupled to pinion 320. Disc brake 304 is preferably used as a static brake even though it may have dynamic brake characteristics to hold the reel 200 from turning either because of motor 302 acting on speed gear 303 or from the pipe 215 acting to pull reel 200. Disc brake 304 would be used every time braking is applied to the reel 200. Just before reel 200 stops, disk brake 304 would be hydraulically (not shown) activated, to keep the surface of the brake shoes and discs free of corrosion by being applied just before stoppage.

Maintaining the $\frac{1}{16}$" meshing tolerance of bull gear 204 and drive pinion 320 is an important parameter, moreover, true concentricity of the circular bull gear 204 relative to rotating about the center of the reel 200 is required. The procedure to ensure correct meshing tolerances is as follows: Rotate reel 200 and inscribe a circle 230 on the outer edge of top of lower flange 203 utilizing the operating tolerances of center bearing 205. The control of tolerances of bull gear 204 is defined by inscribed circle 230.

Disc brake 304 is coupled to a gear reduction right angle planetary 305 driving a pinion 320 which drives the bull gear 204 of the storage reel 200.

The pinion 320 is engaged and disengaged by two hydraulic cylinders 321 (FIG. 7). Each drive set 306, 307, 308, 309 is kept secure in a linear configuration by four linear bearing sets 322. Drive sets 306,307,308,309 are all mounted on a single skid 301. Skid 301 may be removed as a single unit separately from reel 200 or during the same period of time the reel 200 is removed. Skid 301 is removed for the same reason reel 200 is removed to make room for the conventional pipe laying devices such as pipe handling ramp 150. Alternatively skid 301 may be bolted or otherwise attached to outer grillage 214 and thus reel drive 300 can be removed simultaneously with the reel 200 by one skidding action.

Multiple Jobs (FIG. 1)

In spooling pipe 215 on reel 200, it is possible to spool several jobs of pipe 215 on the reel 200. These would be serially spooled onto the reel 200 and each one would individually be tied off as described above so that they maintain their own tension. For example, the two pad eyes 218 could be used to tie off the first job or it could be welded in place and then a second job spooled onto the reel 200. Alternatively, two pipes 215 could be spooled onto reel 200 simultaneously if a job permits the simultaneous laying of two pipes 215. As discussed below, the spooled pipes 215 would be straightened by straightener 400 simultaneously.

Straightener/Aligner 400 (FIGS. 9–15)

The straightener/aligner 400, referred to as "s/a," receives pipe 215 from reel 200 (FIGS. 2, 3). The s/a 400 includes a steel support structure 401 supporting the level winding carriage 402 (shown in two positions, one in phantom line, in FIGS. 9, 10) and an operator's cab 403 looking aft. Four hydraulic cylinders 404 are used to level wind the carriage 402. The four hydraulic cylinders 404 are mechanically coupled together by a synchronizing system 450. The synchronizing system 450 (FIG. 13) includes four racks 405 and pinions 406, the racks 405 mounted on the vertical support frame 412 of the corners of s/a 400, and the pinions 406 are mounted on the carriage 402 underside meshing to the racks 405. The synchronizing system 450 also has the pinions 406 freely rotating as a carriage 402 rides up and down on racks 405.

Pinion 406 on the forward part of vessel 100 couples to a right angle gear box 409, and the aft pinion 406 also couples through a torque tube 408 running forward to box 409. This is true on both the port and starboard side of s/a 400. The two boxes 409 are coupled by a torque tube 465 connecting the adjacent sides Port and Starboard. Thus, the pinions 406 of the synchronizing system 450 mechanically couple the torque tubes 408 running forward and aft of vessel 100 and maintains the level wind carriage 402 horizontal in orientation. This synchronizing system 450 of the level wind carriage 402 creates redundancy and eliminates single point failures, such as a failure of any of the hydraulic cylinders 404 or the brackets/sheaves 460 having no effect on the level of carriage 402. Thus, with this synchronizing system 450, a total failure of one hydraulic cylinder 404 will not prevent the carriage 402 from level winding properly due to the mechanical couple of the hydraulic cylinders 404 in the level winding system.

The purpose of the s/a 400 is to guide the pipe 215 on and off the reel 200 in a straightened condition. The level wind position of the carriage 402 is preferably manually controlled from the operator cab 403, although it could be automatically controlled. The level wind position of the equipment aft of the s/a 400, i.e., the tensioners 500 and exit rollers 600, are automatically conformingly controlled to produce a specific desired pipe profile preprogrammed in the control system 900. This level wind position is accomplished by using the output of one of two Linear Variable Differential Transformer (LVDT's) 410 for the level wind cylinders 404 per each of the two level wind cylinders 404, preferably only two cylinders having LVDT's 404 and those two cylinders 404 being on opposing corners of the s/a 400 on the vessel 100 as a datum, and preferably using one signal when they are both performing with the other as a back-up, and alerting the operator if only one is performing. The output of the LVDT 404 is to be an input to the calculation of an algorithm which by methods well know in the art reproduce a desired pipe 215 profile and orientation of the pipe 215 aft of the s/a 400. This sets the desired height of the level wind cylinders of both tensioners 500 and exit rollers 600 to achieve the desired pipe 215 profile preset before pipelaying commences. The LVDT's 410 provide the necessary feed forward signal to the control system 900 (FIG. 3). This signal is translated into a precise level control profile which sets the level winding position of the two tensioners 500 and three exit rollers 600, as more fully discussed below, to match the desired pipe 215 profile. Pipe bowing or looping is avoided by using two tension control loops, one controlling tension aft of the aft tensioner 500, and the other controlling tension between reel 200 and forward tensioner 500. These two control loops operate in cascade. The level winding position of the tensioners 500 and exit rollers 600 is crucial to minimize the strain imposed on the pipe 215.

The carriage 402 includes three tracks 413, 414, 415 (FIGS. 12,13) and an operators cab 403. Each track 413, 414, 415 utilizes elasto plastic pads 411 not to damage pipe 215 and pipe coating during the spooling and pipelay operation. During spooling both tracks 414, 415 are disengaged away from the path of the pipe 215 and the only pipe to pad contact is track 412.

The pipe 215 is only plastically deformed in one direction during the spooling operation. Unlike the prior art, there is only one bending operation of the pipe 215 during spooling. Moreover, there is no substantial reverse bending of the pipe 215. In the pipe straightening process the reverse bending is minimized to obtain minimum residual strain in the pipe 215, without tendency to overstraighten. This process has been adopted to minimize the amount of working of the pipe 215 and to maintain the pipe 215 roundness. In the prior art, the pipe alley is located on the port side of the vessel. The pipe is routed from the port side to the starboard side of the reel spooling in the counter-clockwise direction, thus reverse bending the pipe. This invention utilizes the starboard side of the vessel spooling 100 in the counter clockwise direction. This invention does not substantially reverse bend the pipe 215. Track 413 is the only one used in spooling because no straightening operation is performed during the spooling operation. Tracks 414 and 415 are used for straightening purposes which are unnecessary in spooling. Thus, they are not used. Track 413 guides pipe 215 onto the appropriate part of reel 200, thereby minimizing strain on pipe 215 during the spooling operation as it comes off of its storage area.

Once the desired length of pipe 215 is spooled on to the storage reel 200, all three tracks 413, 414, 415 of the s/a 400 are positioned on a predetermined calculated setting by testing to achieve the desired horizontal orientation. In these computations the pipe back tension and the upstream and downstream equipment spacings and geometries also feature as input data. To efficiently straighten a pipe it has to be forced into a particular reverse curve. A small amount of elasticity of coatings and the thick resilient form of track pads redistribute local deviations from the ideal "exact" roller settings. It is not necessary to provide "touch of button" hydraulic cylinder adjustments for each roller. This would add greatly to the complexity of the tracks and could reduce the required rigidity of control on the pipe bending.

Tracks 413, 414, 415 may position themselves only in the horizontal plane, not in the vertical plan. Thus, the vertical setting of pipe 215 is accomplished only by carriage 402. The purpose of tracks 413, 414, 415 during pipe laying operation is to properly position the pipe 215 in horizontal orientation. This straightens the pipe 215. The optimum settings for the tracks of the pipe straightener are those which generate even pad 411 pressures on the pipe 215 wall, or coating, at every pad 411 of each track 413, 414, 415. When several pipes of different diameters are to be laid during a single voyage then standard track contours can be adopted such that only whole-body movements of the middle track 414, and possibly the inlet 413 and outlet 415 tracks, are required to reset the straightener 400 for the different pipes 215. The standard settings are chosen such that the track contours are close to the even pad pressure case, for the maximum pipe size and wall thickness to be deployed, and also such that specified coating pressures are not exceeded for other pipes 215, where the pad pressures are not uniform. The most efficient straightening is achieved with even pad pressures at each track, and with pipe plasticity over the whole length of the middle straightener track 414. This distribution of moments minimizes both the local strains in the pipe section and the required reverse curvature of the pipe to achieve straightening. Accordingly, when it is required to carry out rapid resetting of the pipe straightener 400 to suit different pipes 215 then this can be achieved using track contours for one pipe 215 and by whole-body movement of the individual tracks 413, 414, 415. The standard track contours are related to even pad 411 pressures for a larger diameter pipe 215 of the highest grade material. When pipes 215 of lesser grade, or pipes 215 of similar diameters are to be straightened, then usually only the middle track 414 requires to be moved and fairly even pad 411 pressures are maintained at the interface with the pipe 215.

Tracks 413, 415 are manually adjusted tracks. The position of tracks 413, 415 are set after the spooling process during the pipe laying trials. The carriage 402 of the straightener 400 is set slightly proud relative to pipe 215 on the reel to provide near constant prestraightening conditions for the pipe from different layers and coils on the reel. Tracks 413, 415 are preset as part of the trials in order to achieve sufficient reverse bending of pipe 215 that the ultimate result from the plastically deformed pipe 215 on the reel 200 is the desired straight pipe in the horizontal direction; i.e., looking down on the pipe and seeing it straight at the exit from s/a 400. This straightening process is in conjunction with track 414 as well as tracks 413 and 415. Thus, tracks 413, 415 are positioned to receive pipe 215 and to permit track 414 to perform the actual reverse bending operation, thereby removing the curvature of the pipe 215 that it experiences coming off the reel 200.

Before pipe laying operations can start, the straightness of the pipe 215 departing the s/a 400 must be determined from pipe 215 straightening trials as discussed above to determine the curvature of the pipe 215 in the horizontal direction upon exiting the s/a 400 for adjusting tracks 413, 414, 415. Pipe straightening trials are preformed until a desired straightness is achieved. If multiple jobs for pipes 215 are spooled on the same reel 200, each job would have its straightening trials done after its spooling before the next job is completed. If simultaneously pipes 215 are used, the straightening trials would adjust the track settings 413, 415 and then track 414 for each pipe 215 at the same time. Normally, the same pipe 215 would have to be used on both parts of the simultaneous lay because the degrees of freedom on the preferred embodiment are not sufficient to vary the forces straightening the pipe in the horizontal direction for individual pipes 215.

Ultimately, each track 413, 414, 415 is adjusted during the straightening trials until a suitable straightness is achieved by confirming the pipe 215 runs straight down the pipe alley. Both tracks 413, 415 are manually adjusted by control valves 470 to hydraulic fluid controlling the piston 471 extension from hydraulic cylinders 412. The hydraulic cylinders 412 push against carriage 402 and respectively adjust the position of the rigid tracks 413, 415. The desired position of tracks 413, 415 are secured when reached manually by shimming blocks or plates 472. Shim plates 472, in varying thicknesses, are either added or removed manually until the desired position of each track 413, 415 is achieved to achieve pipe 215 straightness.

Track 414 (middle track) is a highly specialized unit because unlike tracks 413, 415, it has remote control capability by a synchronized positioning system 480. Using only one such track 414 (utilizing in the preferred embodiment screw jacks) helps control the costs of the system and is thus preferable. Four hydraulically powered screw jacks 407 (FIGS. 14 and 15) like cylinders 412 push against carriage 420 of the s/a 400 and position track 414 relative to tracks 413, 415. The powered screw jacks 407 are mechanically coupled similarly to carriage 402 to determine the position of the tracks 413, 414, 415. The control of track 414 can be either manual/visual or computer controlled. For the synchronized positioning system 480, each of the screw jacks 407 is connected to a couplings 476, two of the couplings being attached to torque tubes 477 running from forward to aft on the upper and lower ends of the positioning system 480 of track 414. All of these torque tubes 477 are on the port side of track 414. A drive 478 is positioned between upper and lower screw jacks 407 (FIG. 14) coupled by couplings 476 to gear boxes 479. The coupling of the powered screw jacks 407 is to have them all work together as a unit, applying the same force at the same time to avoid having one of them skew the track 414 while it is in operation.

An optical encoder 481 provides necessary feed back of the position of one screw jack 407, and hence because they are mechanically coupled, all screw jacks 407 to determine the actual position of the track 414 relative to the pipe 215 in the horizontal plane. The computer controlled track 414, whether running manually or automatically, gives the s/a 400 the flexibility in achieving the imposed operational constraints for straightness of pipe 215.

In most instances the control is set so that the cross section of the pipe 215 is uniform with no obvious obstructions. In deep water applications the spooled pipe 215 can contain buckle arrestors, anodes or other obstructions relating to pipe-in-pipe systems. In the manual mode, should an obstruction that is part of spooled pipe 215 occur, the operator would see it coming and override the jack 407 operation on track 414 until the operator sees the obstruction passes and by command instructs jacks 407 to restore track 414 to its exact position prior to the advent of the obstruction. There is no automatic mode in the preferred embodiment to accomplish this same purpose such as by pressure or forward viewing optics.

As shown on FIG. 11, pipe 215 feeds around track 413 and is reverse bent by track 414 which forces the pipe 215 against tracks 413 and 415. Tracks 414 and 413 are also powered to rotate in order to lower the amount of frictional force between each of tracks 413, 414 with pipe 215 not to damage coating of pipe 215 during spooling and laying. Each of tracks 413, 414, 415 has several s/a pads 411. The pads 411 are shaped so that they will work with any size pipes within the parameters of the preferred embodiment, without change from pipe to pipe. However, if simultaneous pipe lays are being used, wherein two pipes 215 are simultaneously layed, then the pads would be changed to reflect having dual pipes 215. Such change would be by manual means between jobs, keeping the pipe 215 tensioned on the reel 200 by tying the pipe 215 to be pinned to the reel 200 as discussed above.

To increase the efficiency of conventional lay operations, the carriage 402 is positioned at the top of the support structure and mechanically locked in place. This is done to permit room for an additional work station beneath the carriage in the conventional pipelay mode of operation as discussed above.

The preferred mode will require an observer to command the first level wind platform (aligner/straightener platform) to the desired height. In this configuration, all the other platforms discussed below will track to where they should be in reference to the first platform vis-a-vis the pipeline database. A manual trim facility (not shown) is also provided.

A first alternate mode will be semi-automatic, with the ideal position being derived within the control system 900 related to product length being taken on or off the reel 200. A manual trim facility would be provided. A software-based calculation would determine the height of the pipe 215 relative to the set datum. The feedback for this calculation would be related to product length taken on or off the reel 200 combined with a reel revolutions/product diameter calculation. The level wind control system 900 will then determine all level wind platform positions, and monitor to check if they are within a certain tolerance. If not, the control system 900 will direct the respective cylinder actuator to move to the proper position thus adjusting the respective level wind platform to the desired height.

A second alternate mode will allow all the platforms to be controlled independently through the use of raise/lower push buttons located at the control console or local to the level wind platform being controlled. Local or control console control would be determined only from the control console. Indication will be provided to show whether local or control console control is active.

Figure 16:
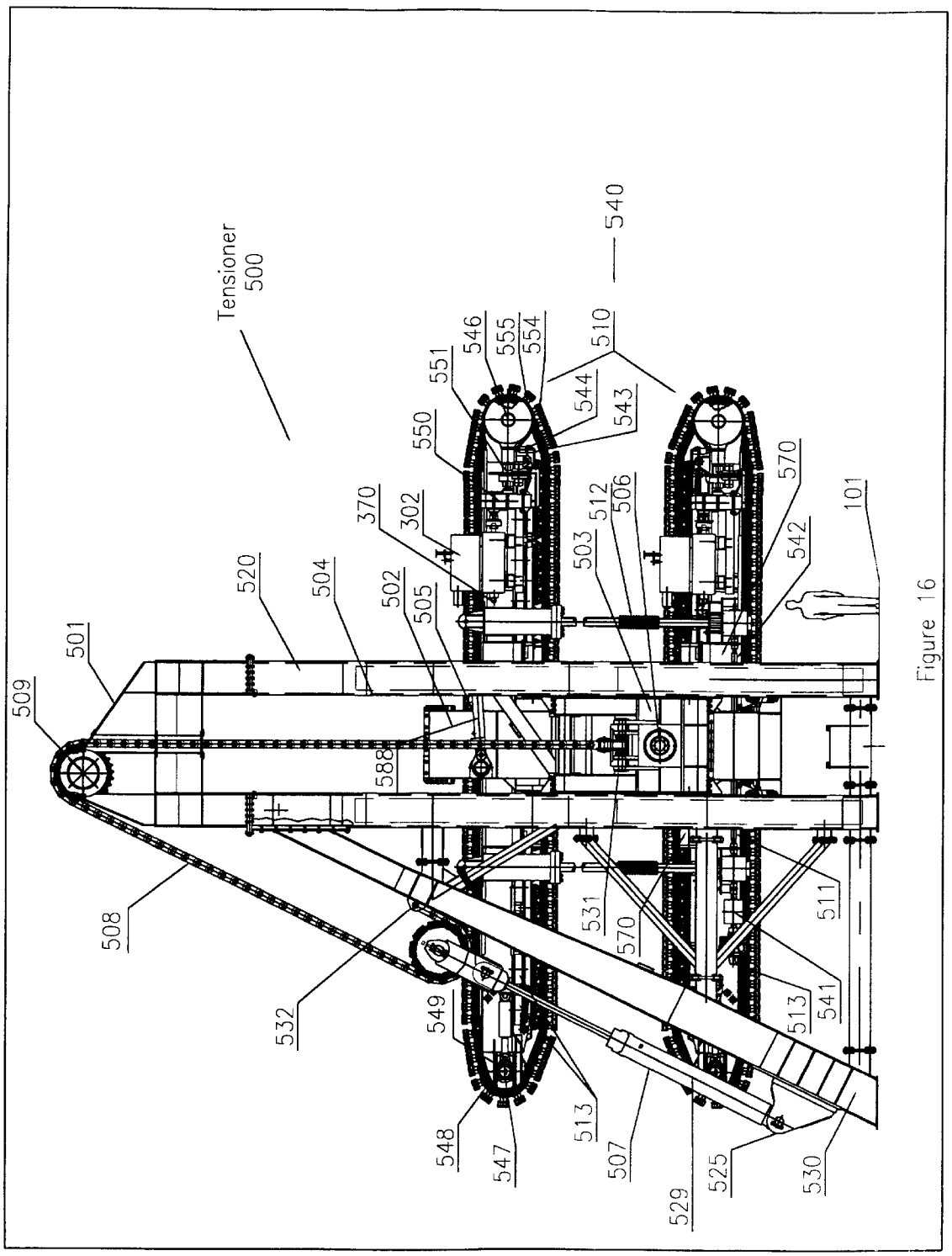
FIG. 16 is an elevation side view of the tensioner.
Figure 17:
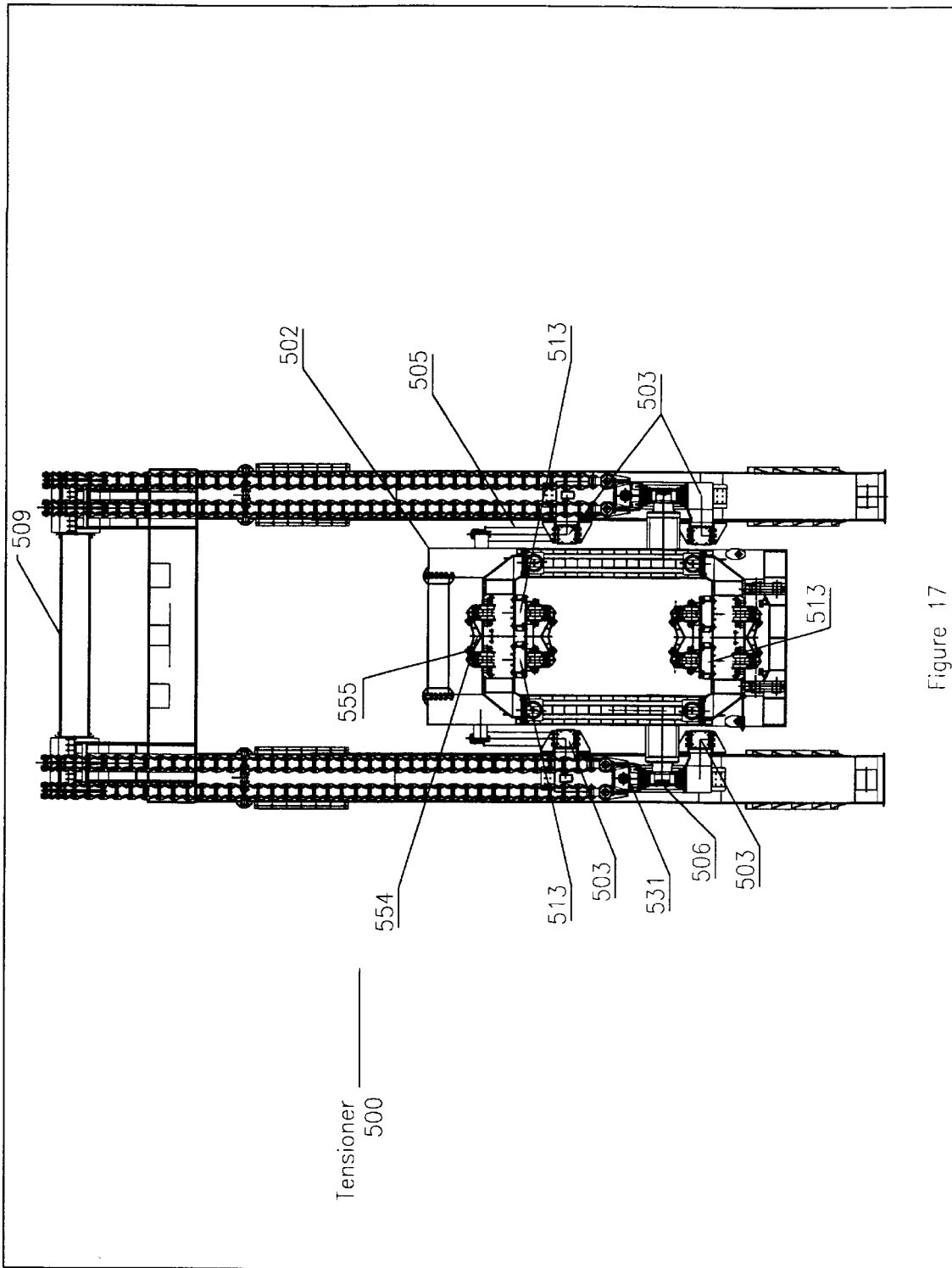
FIG. 17 is an elevation end view of the tensioner.
Figure 18:
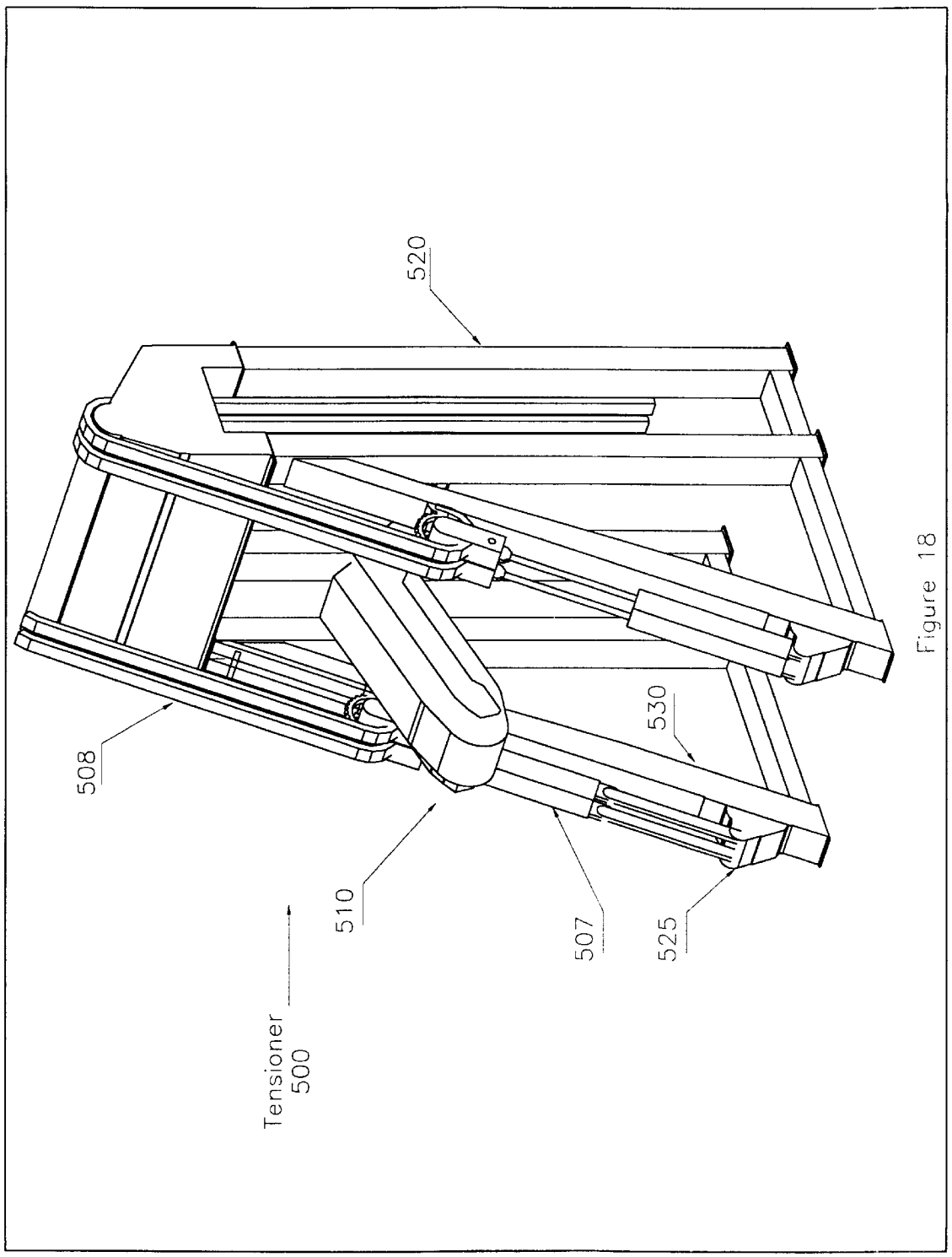
FIG. 18 is a three dimensional partial rendition of the tensioner, including one track of the level wind system.

Tensioners 500 (FIGS. 16, 17, 18)

Back tension on the pipe 215 to the reel 200 is required to ensure efficient straightening and constant input pipe geometry to the straightening process. To minimize the cumulative pipe strain it is advantageous to set the back tension on the pipe 215 such that the pull from the reel 200 straightens the pipe 215 to approximately the radius of the track 413. In this way re-bending of the pipe 215 is avoided at track 413, and ovality of the pipe 215 is minimized. The back tension from tensioners 500 does not have to be set at an exact magnitude but should be maintained within a band of the recommended magnitude +/−20%.

Two tensioners 500 are placed in series aft of s/a 400. Each tensioner 500 is comprised of a steel support structure 501 on which is pivotally mounted by pivot 506 a steel track assembly frame 502. Two carriages 503 for each tensioner 500 slide on bearing strips 504 the vertical length of the support structure legs 520. The carriages 503 support the track frame 502 and the track frame 502 pivots with respect to carriages 503 about pivots 506. The attitude (pitch) of the track assembly frame 502 can be adjusted by two hydraulic cylinders 505 rotating about two bearings 506 of the carriage. The reason jack assembly frame 502 would need to be adjusted by the two hydraulic cylinders 505 so that track assembly frame 502 could rotate about bearings 506 is to conform to the desired pipe 215 profile as it is introduced into the tensioners 500 because that profile could still be convex because the tensioners 500 are in the overbend area of pipe 215.

The level winding of the carriages 503 are positioned by four hydraulic cylinders 507 attached to carriage 503, two on each side of track assembly frame 502. In specific, the cylinders 507 are attached at their base by brackets 525 to knee braces 530 of legs 520. The other ends are attached to four chains 508. Chains 508 are attached at their other end at balancing mechanism 531 of both adjacent carriages 503 and "dead man" terminate on bracket 532. The level winding of both carriages 503 are mechanically coupled by a balancing shaft 509.

Balancing shaft 509 forces either chain 508 will have equal tension. The purpose of cylinders 507 is that as they extend, i.e. the pistons extend farther out of the cylinders, the effect is to cause carriages 503 to be lowered relative to the deck 101.

The track assembly frame 502 houses two tensioner tracks 510 and squeeze assembly 540. The squeeze assembly 540 includes four mechanically coupled 511 screw jacks 512. The mechanical coupling 511 includes a hydraulic motor 513. The hydraulic motor 513 turns gear box 541. The gear box 541 turns torque tubes 542 in a similar manner to that of the s/a 400. The bottom track 510, i.e. the one closest to deck 101 does not move relative to track frame assembly 502. Only the top track 510, i.e. the one farthest from the deck 101 moves relative to track frame 502. The mechanical coupling 511 maintains the level state of tracks 510. For purposes of being able to see how the pipe lays between the top and bottom tracks 510, the top and bottom tracks 510 are left open in the drawings. In actual practice, these would be very close together, sandwiching pipe 215 between upper and lower tracks 510. This would close any gaps shown in the figures. The closing of the gap is accomplished through the screw jacks 512 as discussed above. While the screw jacks 512 position the tracks, airbags 513 are provided which inflate providing the normal force to squeeze the pipe 215. The number of air bags 513 and their position with regard to cluster control, for example, four air bags are inflated and deflated as one unit, are regulated for reasons of redundancy. Thus, a failure for a set of air bags 513 does not cause a loss of normal force for a long section of track 510. Obviously the number of air bags 513 and the grouping of control need to be minimized for economy in construction. The tensioner tracks 510 are positioned against the pipe 215 to provide the necessary normal force to maintain the tension on pipe 215. The tension on pipe 215 is maintained in either direction, i.e. if the spooling is occurring or if the laying is occurring as an operation. LVDT's 529 determine level wind position for pipe 215 going through the tensioners 500 as discussed above. In addition, compensation cylinders 543 are provided at the inlet end and outlet end of tracks 510 to hold up the ends 544 of air bag plates 545. The desired positions of compensation cylinders 543 are preferably manually set at the beginning of each job. Further the rear axle 547 of the drive chain 548 of the tracks 510 is on a slide 549 and is positioned in response to pressure reflecting changes of varying drive chain 548 tensions.

There are four D.C. motors 302 provided to operate the tracks 510. The D.C. motors 302 are used to power the tracks 510 at varying speeds to adjust the tension on the pipe 215 exerted by tracks 510. The control system 900 regulates these in much the same way the reel motors 302 are regulated. The drive system of tensioners 500 comprises D.C. motor 302 coupled to two speed gear box 550, coupled to disc brake 551, coupled to right angle planetary 552, coupled to drive sprocket 553, coupled to drive chain 548. The cross ties 554 are bolted to chain 548. The tensioner pads 555 are bolted to cross ties 554. This completes the connection from D.C. motor 302 to pipe 215.

The pitch of tracks 510 are automatically controlled to conform to the desired convex over bend in the pipe 215 at the specific location relative to barge 100 by cylinders 505.

LVDT's 588 provide the necessary feedback to the control system 900 to control the desired pitch of the tracks 510.

Figure 19:
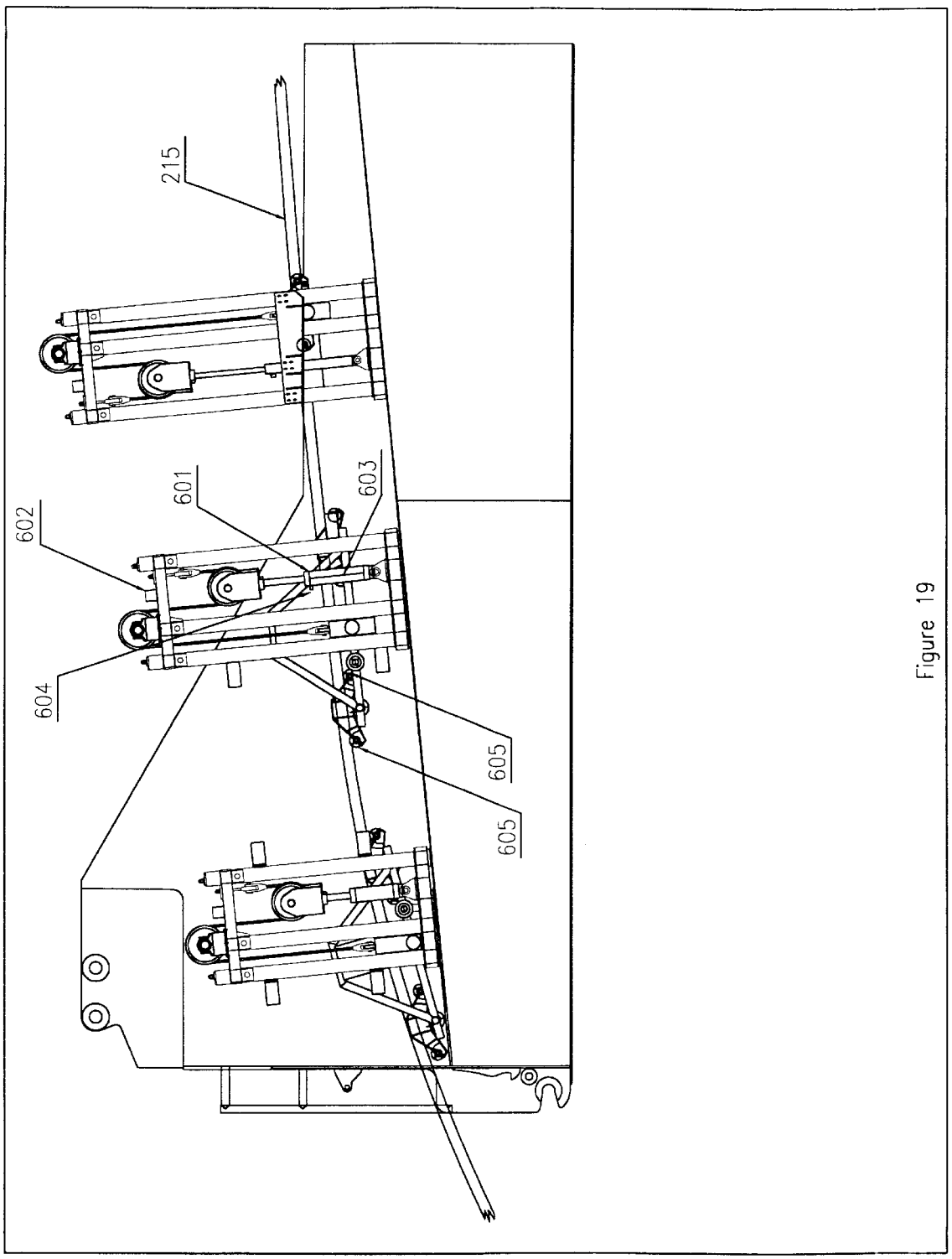
FIG. 19 is an elevation side view of the three exit rollers.

Exit Rollers 600 (FIG. 19)

To provide vertical support of the pipe 215 to maintain one proper pipe profile, as discussed above, between the tensioners 500 and the stinger 800, three exit rollers 600 are used. Each exit roller 600 has level winding capability to support the pipe 215 to a specified pipe profile, as discussed above. The level winding of each of the exit rollers 600 are positioned by two hydraulic cylinders 601. The control of such cylinders utilizes dual hydraulic proportional control valves 602.

A pressure transducer 604 for each cylinder 601 is located such that it will sense the pressure between pipe 215 and cylinder 601 to indicate the vertical load of pipe 215 at that location on barge 100. In this way, if one pressure transducer 604 is reading a greater pressure value, this would be indicative of the pipe 215 having rolled more to one side. The hydraulic proportional control valves 602 in response to LVDT's 603 position cylinders 601. LVDT's 603 provide the necessary sensor input to control system 900 to determine the current vertical position of each roller 605. The input of the LVDT's 603 are used by the control system 900 as a feedback to make sure that the proper pipe profile is being maintained by each of the exit rollers 600, as discussed above. Alternatively, instead of computer control by control system 900, if the system is on manual, the vertical position of each of the exit rollers 600 can be manually inputted to a local level control or can be manually set.

Figure 20:
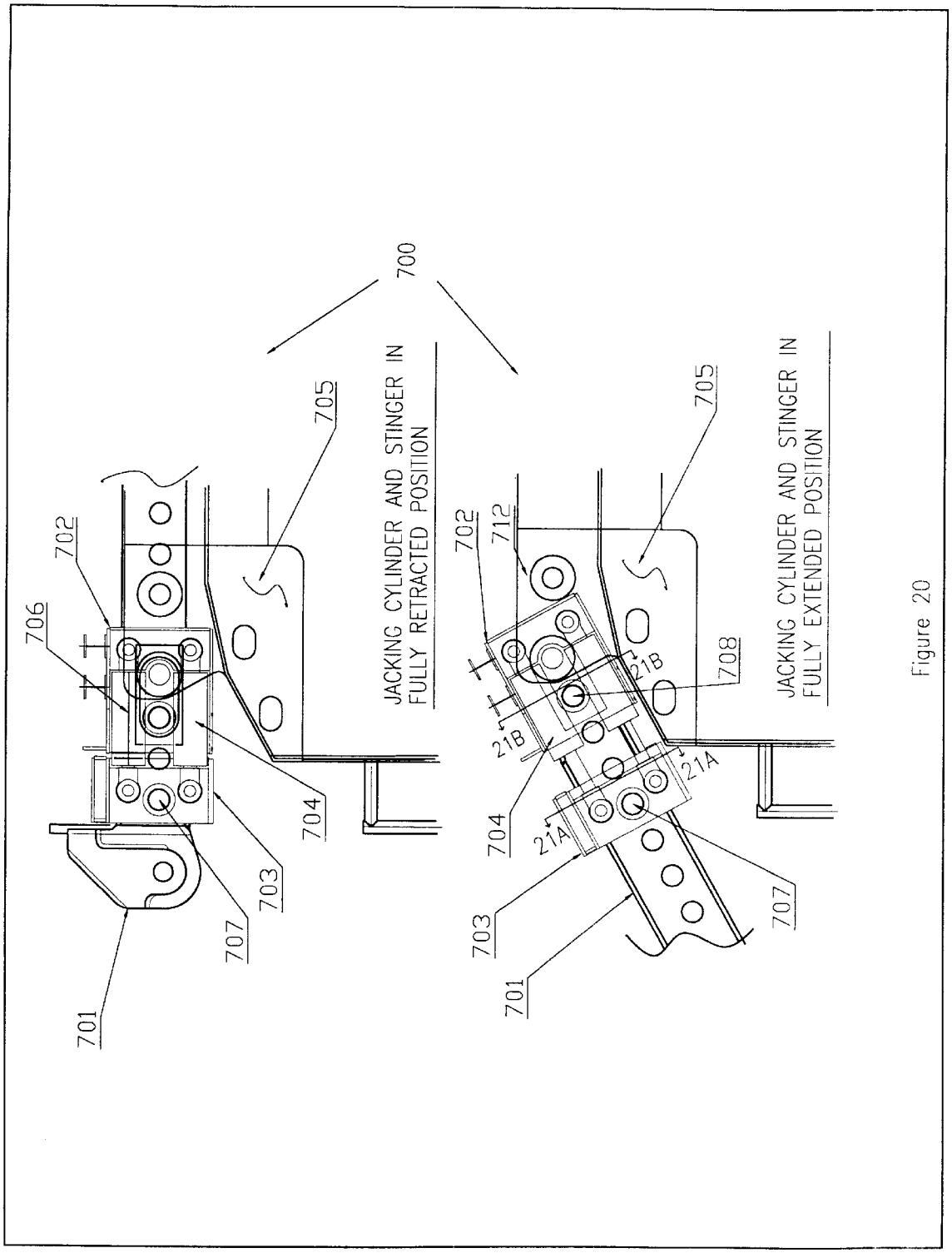
FIG. 20 is an elevation view of the stinger jacking system in two positions.
Figures 21A, 21B:
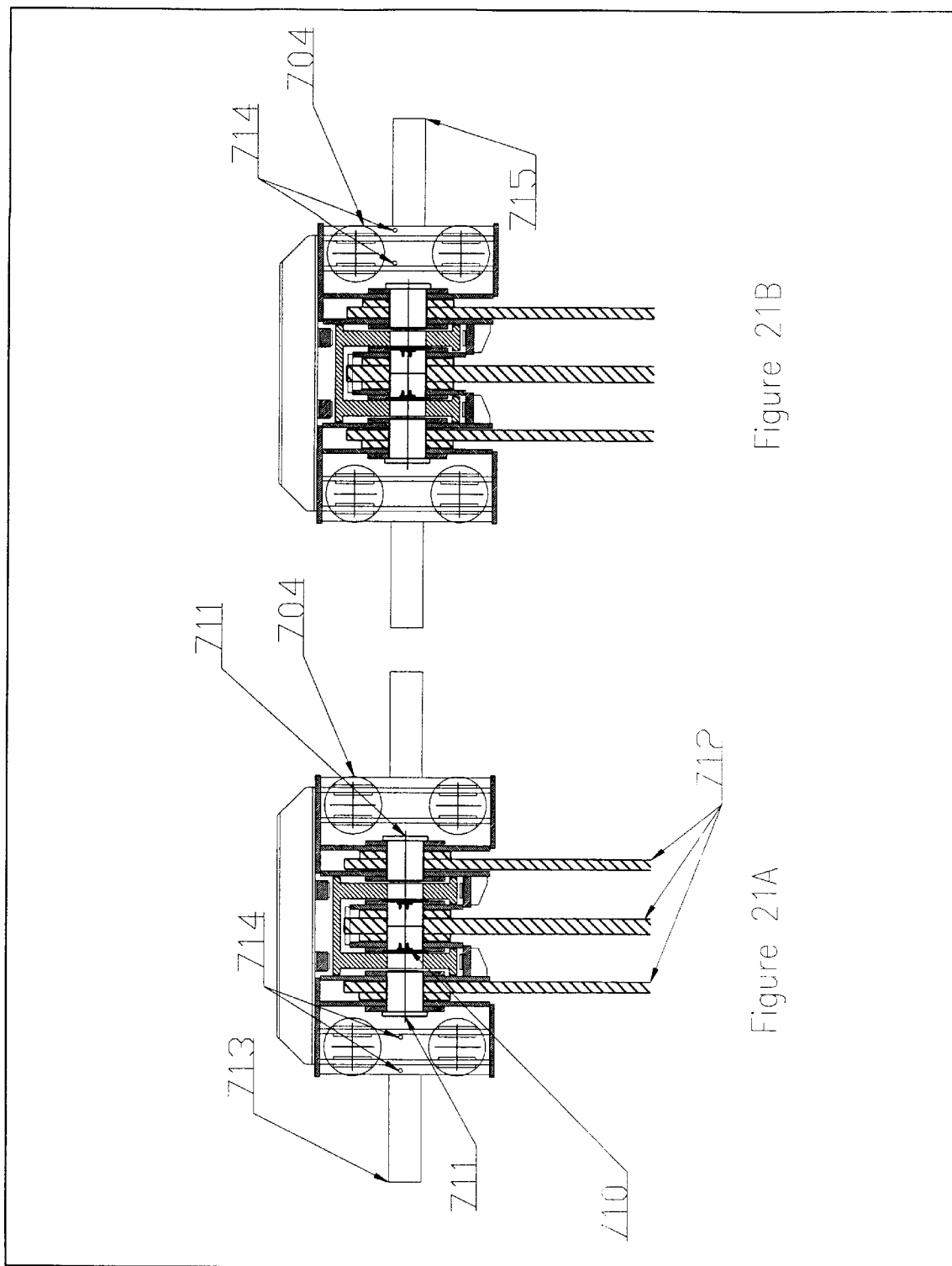
FIG. 21A is the end view of the jacking system of FIG. 20 taken along section lines 21A—21A.
FIG. 21B is the end view of the jacking system of FIG. 20 taken along section lines 21B—21B.

Stinger Jacking 700 (FIGS. 20,21,22)

The stinger jacking systems 700 positions the stinger 800 to meet the operational requirements of the individual pipe lay job, such as pipe diameter, wall thickness, tension requirements (including whether it is layed flooded or void) and the like. There is a link bar 701 link for each stinger jacking system 700 to the stinger 800, thereby connecting the stinger 800 to barge 100. The connection is made by a wing wall 705 for each stinger jacking system 700. Wing wall 705 is an integral part of the barge 100. Two jacking systems 700, one on each link bar 701, provide the means for adjustment for the position compensation discussed above.

Each stinger jacking system 700 is comprised of a stationary box 702, a stroking box 703, pins 708, 707, 711, 710 and hydraulic cylinders 704. The stationary box 702 is pinned to the wing wall 705 through pad eyes 712 in which are inserted three permanent pins, one inner or center pin 710 and two outer pins 711. By using three pins 710, 711, certain degrees of latitude are permitted for a link bar 701 discussed below. The stroking box 703 is mounted to reciprocate adjacent to stationary box 702. The stroking box 703 is actuated by four hydraulic cylinders 704. Extensions of the pistons of cylinders 704 are measured by LVDT's 706 to provide the necessary feedback to determine the actual position of the stroking box 703 relative to stationary box 702. FIG. 20 shows the extreme positions of the stroking box 703 relative to stationary box 702. A link bar 701 which changes its position relative to the wing wall 705 but not stinger 800 is sized to be free to move within the stationary 702 box and stroking box 703. The link bar 701 is free to move between the three permanent pins 710, 711's.

With pin 708 inserted and pin 707 pulled the jacking process starts by extending the stroking box 703 by use of hydraulic cylinders 704 and inserting its pins 707 by hydraulic pinning cylinders 713, locking the link bar 701 in place relative to the stroking box 703. Confirmation of the setting of the pins 707 is a necessary control function by proximity switches 714. The next step is to remove the stationary box pins 708 which are parallel to pins 707. Box pins 708 are removed by hydraulic pinning cylinders 715 in a manner similar to hydraulic pinning cylinder 713. Once pins 708 are removed, the jacking cylinders 704 may be actuated, to move the link bar 701 through the stationary box 702. This process of stepwise movement involving link bar 701, stationary box 702 and stroking box 703 is repeated until the desired position of the stinger 800 is obtained for pipe 215 to have the proper profile upon exit into stinger 800 or for moving the stinger into a traveling position when there is no pipe going through it. The sequence of jacking is shown in FIG. 22.

Spooling/Tensioners/Land System

Control System (General)

The pipelay system 10 has both a conventional pipelay (stock on) and a reel capability, all specifically designed for deep water pipelay. The pipelay system includes the stinger 800, stinger jacking 700, the three support rollers (exit rollers) 600, the two tensioners 500 and in addition for the reel capability the straightener/aligner 400 and the horizontal reel 200. Both the pipelay control system 900 and a dynamic positioning control system 1000 which controls Thrusters 173 also mounted on vessel 100 utilize similar independent systems integrated for full control as a single unit.

The drives for the tensioners 500 and reel 200 are DC motors (such as 285 kw), four for each tensioner 500 and four for the reel 200, twelve in total.

Regenerative Four Quadrant Control of DC Motors Utilizing SCR Drives

Specifically, the tensioners and reel are each driven and braked by four 285 kw separately excited direct current electric motors. The speed and torque of each motor is controlled by an SCR System 905 utilizing Four Quadrant Control and Regenerative Braking.

Power regenerated by these systems in the braking process is fed back into the vessel's power grid and absorbed by the power plant 904 as is well known in the art.

For purposes of redundancy, input power is derived from segregated sources. The 4160 volt, 17.2 megawatt vessel power distribution system is designed with two main switchboards 902 located in physically separated spaces. These switchboards 902 are each fed from three generator sets (not shown) that are physically isolated in two engine rooms (not shown). The switchboards are joined by a Tie Breaker 901, which allows them to share power from all six generators (not shown). This design allows complete failure of one engine room or switchgear room without loss of vessel power.

Power for the SCR Systems 905 that drive and brake the tensioners 500 and reel 200 is derived from, and regenerated to, two 4160 VAC/480 VAC transformers. The primary windings of these transformers are connected to the main switchboards with one on either side of the Tie Breaker 901 in physically isolated spaces.

Each of the reel/tensioner transformers has a dual secondary. Each transformer secondary has an output circuit breaker. The four circuit breakers each feed power to and absorb power from three, Four Quadrant Control Regenerative SCR Systems 905. The SCR Systems 905 are physically mounted three each in four separate portable containers. Each container is securely mounted on the vessel 100.

Each SCR System 905 is connected to one separately excited direct current motor 302. The three SCR Systems 905 mounted in each container feed one motor 302 on the forward tensioner 500, one motor 302 on the aft tensioner 500, and one motor 302 on the reel 200.

The Four Quadrant Control Regenerative SCR Systems 905 are Eurotherm 590 Series Model 720A. The systems 905 control the motors 302 by controlling the armature current of each motor 302. Regulated field (not shown separately) supplies control motor 302 fields. The field supplies have field-weakening features for precise speed control and constant horsepower control. Power is delivered to each motor 302 via a microprocessor-controlled rectifier and returned to the vessel 100 power grid via a microprocessor-controlled inverter. These are standard features and options of the Eurotherm 590 Series Power Converters.

Sensors contained within each SCR System 905 determine the magnitude and direction of current circulating in the armature of each motor 302. Armature speed is derived from tachometers 370 affixed to the armature shaft end. The tachometer 370 input is connected to the SCR System 905 by a fiber optic cable (not shown).

Standard four quadrant regenerative control algorithms are pre-programmed into the microprocessor by the manufacturer. These include armature current control, speed control, and field control.

Special control blocks are pre-programmed into the SCR System 905 microprocessor by the manufacturer. These include: PID control blocks, web handling and center winder blocks, diameter calculator blocks, taper calculator blocks, compensations calculator blocks, torque calculator blocks, and speed demand calculator blocks.

Input/output connection points are provided by Eurotherm for analog and digital points. These are the interconnection points for external command signals, sensor inputs and data output. These connections are used to command the system and to provide feedback.

The SCR Systems 905 utilize these input/output points to communicate with the Opto22 Mystic Controllers by means of digital and analog inputs and outputs. Opto22 Mystic Controllers are fully programmable distributed process controllers. They are programmed utilizing the Cyrano command and control language. Input/output is performed by Opto22 intelligent input and output "bricks" and modules.

SCR Systems communicate operating parameters via RS232 communications ports. Serial information is passed to a SCADA computer 903 for display and logging. The SCADA computer system 903 is able to communicate with and control the Opto22 Mystic Controllers. This provides ready access to tuning parameters and acts as a backup means of control.

The Pipe Control Console, PCC, 906 communicates with the SCR systems 905 through the Distributed Control System. Display of system parameters is provided by two systems, analog and digital displays on the PCC 906, and through mimic screens developed in Wonderware software and displayed on a CRT in the PCC 906.

Definitions

1. Regeneration—When an electrical motor 302 is driven by its load such as the reel 200 unwinding, it acts as a generator absorbing kinetic energy from the load. The kinetic energy is converted into electrical energy.

2. Regenerative Braking—The braking effect on the load of an electrical motor 302 caused by power absorbed in regeneration of electrical energy.

3. SCR—Silicon Controlled Rectifier—A solid state device used to rectify alternating current. An SCR allows current to pass in one direction only. Current will not pass through the device unless it is enabled to do so by the presence of a gate pulse when the device is forward biased.

4. SCR System—A type of system (FIG. 26) in common use throughout industry, which converts an alternating current source into direct current to control the speed, direction and torque of a DC motor. Conversion is accomplished by rectification of the AC input with an SCR bridge.

5. Inverter—A device that converts direct current electricity into alternating current.

6. Four Quadrant—Descriptive term referring to a motion control system which can operate in all four quadrants; i.e., velocity in either direction and torque in either direction.

7. Four Quadrant Control—Control methodology in common use in industry, which controls a motor causing it to accelerate, run, and decelerate in either direction, thereby providing both motive power and breaking power.

8. Tie Breaker—A circuit breaker 901 that electrically joins two switchboards 902 or power distribution panels, thereby allowing electrical power to flow between the two switchboards or panels.

9. SCADA—Supervisory Control and Data Acquisition 903.

10. Distributed Control System—A system characterized by actual control processing taking place in multiple processing units. These distributed processing units receive digital and/or analog inputs, discretizes them if analog, performs digital calculations, and outputs signals to control instruments, actuators and systems.

Control in Conventional Pipelay Mode

The control system in conventional mode is solely tension control. It includes loadcells 570 connected to the tensioners 500. The loadcells 570 are mounted on the rear and forward foundations for strain gage compression, as an example although any kind of tension measurement may be used, which give an output directly relating to the tension (pull) of the pipe 215. The load cell output, eight for each tensioner 500, is compared with the desired tension set point and the difference is sent as an error signal to a PID (proportional, integral, derivative) controller in each SCR Drive, the output of which is connected to the DC motor 302 drives for each tensioner 500 which error drives the motor torque to zero the error.

The DC motor 302 drives will operate in tension mode in all four quadrants (inverting or regenerating mode) and allow the pipe 215 to pay out. The tensioners 500 should preferably operate together, although spacing could be designed to permit only one tensioner to be needed. The loadcells 570 output goes to their respective SCR system 905, as set out above. The SCR systems may be in a master/slave arrangement or each SCR could individually control against its set point. In a master/slave arrangement, the set point would be given to the SCR system 905 of the master tensioner 500. The master tensioner system 905 would then allocate through a hierarchy the load for the master tensioner system and the remaining load would then be shared by the slave tensioner 500 in the same hierarchy manner.

Control in Reel Mode

As set out above, in a system overview it is desirable to have control of both the tension and speed of the pipe 215 during pipelay and spooling. It is also imperative that with a horizontal reel 200 a minimum tension is always maintained on the reel 200 to prevent uncoiling. Constant tension and constant speed modes must both be implemented. Speed claim loops are implemented for supplemental control when the predominate control is constant tension mode and tension clamps are implemented for supplemental control when the predominate control is constant speed mode. Master/slave logic determines which of the three devices 500, 400, 300 is in control and which motor 302 in each device is the master.

PID tension control is implemented utilizing loadcells 570 at the tensioner 500 pivot points 506. The loadcells 570 provide tension feedback to the Opto22 Mystic Controllers. The Mystic Controllers provide appropriate feedback signals to the SCR Systems. Tachometers are installed on each motor 302 to provide feedback of motor speed to implement speed control. PID controllers and system configuration logic are programmed in each SCR System. Open and closed loop control strategies for the reel 200 and tensioners 500 as an integrated system are programmed into the Opto22 Mystic Controllers.

Master/slave logic is developed in the Opto22 controllers utilizing the Cyrano programming language. Algorithms are implemented to both haul in and payout pipe 215. Configuration digital points assign analog setpoints for speed and tension and are input to the PCC 906 and delivered to the SCR Systems 905 by the Distributed Control System.

During normal spooling or laying operations, the primary control function of the reel 200 is to maintain an adjustable minimum tension. This is accomplished by operating the SCR Systems 905 in current limit mode to provide adjustable control of motor torque. An over-speed/under-speed clamp is implemented to compensate for the inertial mass of the reel 200.

Control of the speed of the reel 200 motors 302 is automatically varied to compensate for the wrap diameter of the pipe 215. A manual trim function is provided to adjust for variations in the automatic variance. When the reel 200 is used in conjunction with the tensioners 500, closed loop speed feedback is derived from the tensioner motor encoders 370 transmitting motor 302 speed.

Each tensioner 500 is arranged with bi-directional loadcells. This provides tension sensing in both directions. In pay out mode the aft tensioner 500 SCR Systems are the master units. A tension setpoint is entered from the PCC 906. The forward tensioner acts as a load-sharing slave and receives tension inputs from the master through the Opto22 Mystic controller. Provisions are made in the control algorithms of both the SCR Systems 905 and the Mystic Controllers for operation with both speed and tension control.

In the haul in mode, the roles are reversed with the forward tensioner 500 in master mode and the aft tensioner 500 in slave mode.

In both modes of operation, control loops are implemented to insure that a constant tension is maintained between the reel 200 and the tensioners 500. This is required to support the pipe 215 across the span from the exit of the s/a 400 at the preset profile. Tension is monitored by a PID control loop to insure that it remains in an acceptable range for the size and metallurgy of the pipe 215.

Control loops are implemented to accept a "speed along track" analog input from the Dynamic Positioning System 1000. These control loops are capable of driving pipe 215 either on to or off of the reel 200 at the same speed that the barge 100 is moving along the track.

Operational modes will change with water depth and pipe 215 characteristics. In shallower waters maintenance of pipe tension is more critical than in deeper water, as is the angle of attack of the stinger 800.

In shallower applications pipeline tension will be the controlling parameter for pay out of pipe 215. As the Dynamic Positioning System 1000 moves the barge 100 down track, the tension in the pipeline 215 will rise to the top of the predetermined deadband for the pipe 215. When it does so, pipe 215 will begin to payout. When the barge 100 decelerates to a stop, the tension will fall to the point where the system stops paying out pipe 215.

In deeper water the majority of the pipeline tension is in the vertical plane. Movement down track 2000 adds tension in the horizontal plane. Because the increase in tension is proportionally smaller as the barge 100 moves down track, it takes a longer time to build tension. Because of these factors, it is possible to safely set the tension in the system for a minimum acceptable level and pay out pipe 215 directly equivalent to the footage moved along the track. A control loop is implemented to drive the pipe 215 payout to match the speed along track from the Dynamic Positioning System.

Control of the level wind functions of the system is effected through the use of PID control in the Opto22 Mystic controllers. LVDT's provide position feedback for each of the components. Control logic is implemented to adjust the radius of the pipe departure from s/a 400 based on the elevation of the s/a 400. As discussed above, this is implemented by means of a curve fit that is loaded into the system. Parameters for these curves are developed based upon the requirements of each pipeline.

There are three modes of control of the elevation of the s/a 400 independent, manual, and automatic. In independent mode each unit may be raised and lowered individually from either the PCC or its local control panel. In the manual mode the platform is raised and lowered by the operator to align it with the elevation of the pipe 215 departure point on the reel 200. In the automatic mode, a model of the reel 200 is implemented in the control software that remembers where the pipe 215 departure point is based upon the diameter of the pipe 215 and the footage reeled onto or off of the reel 200. Operator intervention is programmed into the system to compensate for slippage and to designate the point at which the pipe layers change. The brakes on all the equipment are software controlled to only release when a minimum level of motor torque is established to keep the pads clear and one torques the motor upon start to have a smooth transition.

Spooling Layed Pipe

The pipe 215 is maintained lightly on the reel 200 with the tensioners 500 operating in tension mode to provide a back drag as set out above. The tension control setting for the tensioner 500 closest to the reel 200 and the reel 200 is set, as well as the speed and is adjusted to compensate for the varying drag provided by the length of pipe 215 if pipe 215 is being recovered from the sea bed 2000. The tensioner brakes 551 are only released when sufficient motor 302 torque is developed. The reel 200 is operated in the speed mode to provide full torque to overcome reel 200 inertia, both static (stiction) and dynamic (load) on start up, as discussed above. On running, the reel 200 rotates at the constant speed set on the control dial for the set point. On stopping, the reel 200 is regeneratively braked. The reel 200 speed is interfaced with the dynamic positioning system 1000 to match the speed of the pipe 215 lay to the vessel 100 speed by, for example, cascade control. The SCR system controls the motors 302 to take out the momentum as the pipe 215 slows to a stop. The output of the tensioner encoders 570 encoding such output to speed is used as the feedback to the reel speed controller to give a true line speed independent of the layer on the spool 201 being wound.

Pipelay

The reel 200 and tensioner 500 operation is as set out above. A constant tension is maintained between the reel 200 and the s/a 400 by a controller having input 570 and output to SCR System 905 with a PID algorithm. The reel drive 300 either powers the motors 302 or regenerates as the pipe 215 is pulled off the reel 200 at the speed set by the tensioners 500, as described above.

Compensation is applied for reel 200 inertia by speed feedback and by manual input for the layer on the spool 201 currently being worked. As the vessel 100 moves down the route or track for pipe laying, the integrated control system 900 senses the rise in tension and pays out pipe 215 to maintain tension within the dead band set by the operator around the tension set point. The dynamic positioning system 1000 may be interconnected to the control system 900 to synchronize movement rate down track with pipe lay rate.

Determining the departure angle (tension) of the pipe 215 relative to the tip of stinger 800 is also an important parameter. The horizontal component (thrust) in addition to maintaining vessel 100 position determines the tension on the pipeline set by tensioners 500 and reel 200. It should be noted that various methods are used to determine the lift off of the pipe 215 from the last roller of stinger 800. This confirms the precalculated tensioner parameters are met by the system for pipe 215. Various methods may be used which include measurement of distance with a sonar device, measurement of pipe pressure on the final roller by loadcells, television visual confirmation and the like.

Reel Control Loops

The positioning control of the vessel 100 becomes less critical as the vessel 100 progresses to deeper water, the change in pipe 215 departure angle (tension) in relation to the change in vessel position becoming less severe. As the water depth increases there is a corresponding reduction in the resolution and accuracy requirement of the dynamic positioning system 1000. In fact with increasing water depth the tension ceases to be the controlling factor and the length of pipe 215 laid on the route and the water depth determines the vessel 100 position as set out above.

What is claimed as invention is:

1. A barge for laying pipe, comprising:
   a hull;
   a decking mounted on said hull;
   a reel holding the pipe, the pipe being spooled on said reel, and said reel being rotatably, horizontally mounted on and affixed by affixing means to said decking;
   said reel having first means for removing said reel from said decking.
2. The barge of claim 1, wherein said first means includes pad eyes for lifting said reel.
3. The barge of claim 1, wherein there is further included second means for removing said affixation means of said decking to said reel.
4. The barge of claim 3, wherein said second means includes means for removing welding from between said reel and said decking.
5. A barge for laying pipe, comprising:
   a hull;
   a decking mounted on said hull;
   a reel holding the pipe, the pipe being spooled on said reel, and said reel being rotatably, horizontally mounted on and affixed by affixing means to said decking;
   said reel having first means for removing said reel from said decking;
   wherein said reel is divided into pieces, said pieces adapted to be separately removable.
6. The barge of claim 5, wherein said reel is divided into five pieces.
7. The barge of claim 5, wherein the rotational axes of all of said pieces are coaxial.
8. The barge of claim 1, wherein there is further included at least one drive set and said reel is driven by said drive set and said first means includes means for removing said drive set with said reel.
9. A barge for laying pipe, comprising:
   a hull;
   a reel holding the pipe, the pipe being spooled on said reel and rotatably, said reel being horizontally mounted rotatably on said hull;
   wherein there is further provided tension means for spooling by level winding the pipe onto said drum.
10. A barge for laying pipe, comprising:
    a hull;
    a reel holding the pipe, the pipe being spooled on said reel and rotatable said reel being horizontally mounted on said hull;
    wherein there is further provided tension means for spooling the pipe onto said drum;
    wherein said drum has a first end and a first flange, said first flange located at said first end, said first end being located at the narrowest diameter of said drum and the pipe abuts said first flange.
11. The barge of claim 10, wherein said reel has a second end and a second flange, said second flange being at said second end and said second end being located at the greatest diameter of said drum and the pipe being supported by said second flange.
12. A barge for laying pipe, comprising:
    a hull;
    a decking mounted on said hull;
    a reel holding the pipe, the pipe being spooled on said reel and said reel being rotatably, horizontally mounted on said decking;
    said reel having grillage, said grillage supporting said reel and uniformly distributing the load of said reel on said decking.
13. The barge of claim 12, wherein said grillage supports a circular fixed rail and a rotating rail mounted on said grillage, said reel being rotatably mounted on said rails.
14. A barge for laying pipe, comprising:
    a hull;
    a decking mounted on said hull;
    a reel holding the pipe, the pipe being spooled on said reel and said reel being rotatably, horizontally mounted on said decking;

a power source;

removable pinions, said pinions powered by said power source;

a single bull gear powered by said pinions, said bull gear mounted on said reel to rotate said reel through said pinions.

15. The barge of claim 14, wherein said power source is removable.

16. A barge for laying pipe, comprising:

a hull;

a decking mounted on said hull;

a reel holding the pipe, the pipe being spooled on said reel and said reel being rotatably, horizontally mounted on said decking;

a power source;

pinions;

a gear box, said pinions powered by said gear box, said gear box powered by said power source;

a single bull gear powered by said pinions, said bull gear mounted on said reel to rotate said reel through said pinions.

17. A barge for laying pipe, comprising:

a hull;

a decking mounted on said hull;

a reel holding the pipe, the pipe being spooled on said reel and said reel being rotatably, horizontally mounted on said decking;

a level carriage having a redundancy mechanism and a power source, said level carriage adjustable by said power source as to level above said decking to receive the pipe from said reel at about the level from said decking that the pipe is at on said reel, said redundancy mechanism permitting change in level even if said power source partially fails.

18. A barge for laying pipe, comprising:

a hull;

a reel holding the pipe, the pipe being spooled on said reel and said reel being rotatably, horizontally mounted on said hull;

a level carriage having controller means for controlling the pipe profile aft of said level carriage and on said hull to a preset profile.

19. A barge for laying pipe, comprising:

a hull;

a reel holding the pipe, the pipe being spooled on said reel and said reel being rotatably, horizontally mounted on said hull;

a straightener, said straightener includes tracks compressing the pipe to straighten the pipe from its curved shape on said reel;

wherein there are three of said tracks linearly arranged in said straightener, said center track being automatically position controlled.

20. The barge of claim 19, wherein said tracks have pads that contact the pipe, said tracks being set to generate substantially even pad pressures on the wall of the pipe at every one of said pads.

21. The barge of claim 19, wherein said center track is positioned so that the pipe is beyond its plastic limit over the length of the adjacency of the pipe with said center track.

22. The barge of claim 19, wherein said inlet track includes an inlet portion positioned so that said inlet portion prebends the pipe before being spooled onto said reel.

23. A barge for laying pipe, comprising:

a hull;

a reel holding the pipe, the pipe being spooled on said reel and said reel being rotatably, horizontally mounted on said hull;

a straightener having tracks that receive the pipe from said reel at a preset height relative to said reel and compress the pipe to straighten the pipe;

at least one tensioner receiving the pipe from said straightener and applying tension on the pipe through to said reel.

24. The barge of claim 23, wherein said tracks include an inlet track receiving the pipe from said reel and said tension is set such that the pull from said reel straightens the pipe to approximately the radius of said inlet track.

25. The barge of claim 23, wherein said tensioner has track frames and power sources for receiving the pipe, said tensioner track frames being powered by said power sources to be automatically height adjustable independently of other systems to receive the pipe at a preset position relative to the position of the pipe exiting said straightener.

26. The barge of claim 25, wherein said tensioner tracks are pivotably mounted on said tensioner while level winding.

27. A barge for laying pipe, comprising:

a hull;

a reel mounted on said hull, said reel adapted to receive, hold and play out the pipe;

a control system having means for measuring values related to the pipe and controlling the function of said reel;

an automatic control system including thrust means for maintaining the hull position and heading, said reel acting with the pipe at a rate controlled by said automatic control system actively modifying said control system.

28. A barge for laying pipe, comprising:

a hull;

a reel holding the pipe, the pipe being spooled on said reel and said reel being rotatably, horizontally mounted on said hull;

a mechanism for holding the pipe on said reel, said reel feeding out the pipe on the complementary side of said hull to said mechanism, requiring less than thirty degrees for straightening.

29. A barge for laying pipe, comprising:

a hull;

a reel holding the pipe, the pipe being spooled on said reel and said reel being rotatably, horizontally mounted on said hull;

said reel rotated by a D.C. motor variably powered to control the torque developed by said motor, whereby said rotation speed of said reel is controlled.

30. A method for spooling pipe onto a reel mounted on a barge, comprising the steps of:

feeding the pipe through a stinger on the barge with the stinger in its highest position;

feeding the pipe from said stinger through equipment on the barge to the reel while maintaining tension on the pipe feed to the reel;

adjusting the height of the pipe to match a preset profile along the length of the barge dependent on the vertical height of the pipe feed to the reel.

31. A barge for laying pipe, comprising:
a hull;
a reel holding the pipe, the pipe being spooled on said reel and said reel being rotatably, horizontally mounted on said hull;
a pipe handler for receiving, holding and playing out the pipe;
a control system having end control elements and sensors, said system connected to said pipe handler to control the pipe profile on said hull in said pipe handler;
said control system having configuration means for flexibly changing the relationship between said sensors and said end control elements.

32. A barge for laying pipe, comprising:
a hull;
a reel holding the pipe, the pipe being spooled on said reel and said reel being rotatably, horizontally mounted on said hull;
a straightener having tracks that receive the pipe from said reel at a preset height relative to said reel and compress the pipe to straighten the pipe;
at least one tensioner receiving the pipe from said straightener and applying tension on the pipe through to said reel;
wherein said tensioner has track frames and power sources for receiving the pipe, said track frames being powered by said power sources to be automatically height adjustable to receive the pipe at a preset position relative to the position of the pipe exiting said straightener; and
wherein said power sources are interlinked to maintain said tracks adjustable even with a partial failure in such power sources.

33. A barge for laying pipe, comprising:
a hull;
a reel holding the pipe, the pipe being spooled on said reel and said reel being rotatably, horizontally mounted on said hull;
a straightener having tracks that receive the pipe from said reel at a preset height relative to said reel and compress the pipe to straighten the pipe;
at least one tensioner receiving the pipe from said straightener and applying tension on the pipe through to said reel;
wherein said tensioner has track frames and power sources for receiving the pipe, said track frames being powered by said power sources to be automatically height adjustable to receive the pipe at a preset position relative to the position of the pipe exiting said straightener; and
wherein said tracks are interlinked to maintain position even if there is a partial failure of said track frame height adjustment.

34. A barge for laying pipe, comprising:
a hull;
a reel holding the pipe, the pipe being spooled on said reel and said reel being rotatably, horizontally mounted on said hull;
a straightener having tracks that receive the pipe from said reel at a preset height relative to said reel and compress the pipe to straighten the pipe;
at least one tensioner receiving the pipe from said straightener and applying tension on the pipe through to said reel;
wherein said tensioner includes air bags to apply normal force to maintain tension of the pipe.

35. A barge for laying pipe, comprising:
a hull;
a reel holding the pipe, the pipe being spooled on said reel and said reel being rotatably, horizontally mounted on said hull;
a straightener having tracks that receive the pipe from said reel at a preset height relative to said reel and compress the pipe to straighten the pipe;
at least one tensioner receiving the pipe from said straightener and applying tension on the pipe through to said reel;
wherein there is further included at least one exit roller, said exit roller having a level winding control to support the pipe to a preset pipe profile.

36. A barge for laying pipe, comprising:
a hull;
a reel holding the pipe, the pipe being spooled on said reel and said reel being rotatably, horizontally mounted on said hull;
a straightener having tracks that receive the pipe from said reel at a preset height relative to said reel and compress the pipe to straighten the pipe;
at least one tensioner receiving the pipe from said straightener and applying tension on the pipe through to said reel;
wherein there is further included:
   a stinger adapted to receive the pipe and feed the pipe over said hull;
   a stinger jack connected to said stinger to jack said stinger to the proper position to feed the pipe.

37. A barge for laying pipe, comprising:
a hull;
a reel holding the pipe, the pipe being spooled on said reel and said reel being rotatably, horizontally mounted on said hull;
a straightener;
a tensioner;
level winding means, said tensioner and said straightener independently setting said level winding means.

38. The barge of claim 37, wherein there are further included exit rollers, said exit roller independently setting said level winding means from said tensioner and said straightener.

* * * * *